(12) United States Patent
Park

(10) Patent No.: US 9,253,830 B2
(45) Date of Patent: Feb. 2, 2016

(54) LED FLUORESCENT LAMP

(71) Applicants: KUMHO ELECTRIC INC., Seoul (KR); Myung Koo Park, Seoul (KR)

(72) Inventor: Myung Koo Park, Seoul (KR)

(73) Assignees: KUMHO ELECTRIC, INC., Seoul (KR); Myung Koo Park, Seoul (KR)

( * ) Notice: Subject to any disclaimer, the term of this patent is extended or adjusted under 35 U.S.C. 154(b) by 270 days.

(21) Appl. No.: 14/145,420

(22) Filed: Dec. 31, 2013

(65) Prior Publication Data

US 2014/0111112 A1    Apr. 24, 2014

Related U.S. Application Data

(63) Continuation-in-part of application No. 13/708,572, filed on Dec. 7, 2012, now Pat. No. 8,907,557, which is a continuation of application No. 12/473,096, filed on May 27, 2009, now Pat. No. 8,358,056.

(30) Foreign Application Priority Data

| Oct. 16, 2008 | (KR) | .......................... 10-2008-0101413 |
| Nov. 4, 2008 | (KR) | .......................... 10-2008-0109048 |
| Dec. 5, 2008 | (KR) | .......................... 10-2008-0123444 |
| Mar. 4, 2009 | (KR) | .......................... 10-2009-0018268 |

(51) Int. Cl.
    *H05B 33/08*    (2006.01)

(52) U.S. Cl.
    CPC ........ *H05B 33/0809* (2013.01); *H05B 33/0815* (2013.01); *H05B 33/0821* (2013.01); *Y02B 20/386* (2013.01)

(58) Field of Classification Search
    CPC .................... H05B 33/0815; H05B 33/0824
    See application file for complete search history.

(56) References Cited

U.S. PATENT DOCUMENTS

| 6,091,206 A | 7/2000 | Siao |
| 7,701,153 B2 | 4/2010 | Itou et al. |

(Continued)

FOREIGN PATENT DOCUMENTS

| JP | 2008-135274 A | 5/1999 |
| JP | 2004-111104 A | 4/2004 |

(Continued)

OTHER PUBLICATIONS

European Search Report dated Jan. 16, 2013, on European patent application No. 09011057.8.

(Continued)

*Primary Examiner* — Hai L Nguyen
(74) *Attorney, Agent, or Firm* — Rabin & Berdo, P.C.

(57) ABSTRACT

A light-emitting diode (LED) lamp which can replace a typical fluorescent lamp is provided. The LED lamp comprises external connection pins connected to terminals of an electronic or magnetic fluorescent lamp ballast, capacitors connected to each of the external connection pins, diodes connected to each of the capacitors and a LED array connected between the diodes, wherein an first external connection pin, a first capacitor, a first diode, an LED array, a second diode, a second capacitor and a second external connection pin are connected in series. The LED lamp also further comprises a diode connected in anti-parallel with a series circuit of the second diode and the LED array, and another diode connected in anti-parallel with a series circuit of the first diode and the LED array.

4 Claims, 32 Drawing Sheets

(56) References Cited

U.S. PATENT DOCUMENTS

| | | |
|---|---|---|
| 7,791,285 B2 | 9/2010 | Wu |
| 7,855,514 B2 | 12/2010 | Ku et al. |
| 8,089,213 B2 | 1/2012 | Park |
| 8,907,557 B2 * | 12/2014 | Park .................. H05B 33/0803 313/498 |
| 2003/0102810 A1 | 6/2003 | Cross et al. |
| 2003/0122502 A1 | 7/2003 | Clauberg et al. |
| 2006/0193131 A1 | 8/2006 | McGrath et al. |
| 2007/0182338 A1 | 8/2007 | Shteynberg et al. |
| 2010/0109560 A1 | 5/2010 | Yu et al. |

FOREIGN PATENT DOCUMENTS

| | | |
|---|---|---|
| JP | 2004-192833 A | 7/2004 |
| JP | 3117581 U | 12/2005 |
| JP | 2006-100036 A | 4/2006 |
| JP | 3929885 B2 | 3/2007 |
| JP | 2007-257928 A | 10/2007 |
| JP | 2008-243501 A | 10/2008 |
| JP | 2008-258124 A | 10/2008 |
| JP | 2008-277188 A | 11/2008 |
| KR | 10-2004-0033296 A | 4/2004 |
| KR | 10-2007-0095764 A | 10/2007 |
| KR | 10-2008-0047521 A | 5/2008 |
| KR | 10-0844538 B1 | 7/2008 |
| WO | WO 2005/084080 A2 | 9/2005 |
| WO | WO 2006/090535 A1 | 8/2006 |
| WO | WO 2008/136458 A1 | 11/2008 |
| WO | WO 2009/064099 A1 | 5/2009 |

OTHER PUBLICATIONS

European Search Report dated Jan. 16, 2013, on European patent application No. 09011056.0.

* cited by examiner

LED FLUORESCENT LAMP

CROSS-REFERENCE TO RELATED APPLICATION

This application is a continuation-in-part of U.S. application Ser. No. 13/708,572 filed on Dec. 7, 2012, which is a continuation of U.S. application Ser. No. 12/473,098 filed on May 27, 2009. This application also claims the benefit of U.S. application Ser. No. 13/708,572 filed on Dec. 7, 2012, U.S. application Ser. No. 12/473,098 filed on May 27, 2009, Korean Patent Application No. 10-2008-101413 filed on Oct. 16, 2008, No. 10-2008-109048 filed on Nov. 4, 2008, No. 10-2008-123444 filed on Dec. 5, 2008, and No. 10-2009-0018268 filed on Mar. 4, 2009 in the Korean Intellectual Property Office, the disclosures of which are expressly incorporated by reference in their entireties.

BACKGROUND OF THE INVENTION

1. Field of the Invention

The present invention relates to a light-emitting diode (LED) fluorescent lamp, and more particularly, to an LED fluorescent lamp which is suitable for use, instead of a typical fluorescent lamp, with a fluorescent lamp ballast.

2. Description of the Related Art

Due to the improvement of the optical efficiency of light-emitting diodes (LEDs), which has been previously used as low-power indicator lights, the range of application of LEDs has gradually widened. LEDs, unlike other light sources, do not contain mercury and are thus deemed as environment-friendly light sources. Therefore, LEDs have recently come into the limelight as next-generation light sources for mobile terminals, liquid crystal display (LCD) TVs, or automobiles. Accordingly, incandescent lamps or fluorescent lamps, which have been used as major light sources for the past hundred years, are rapidly being replaced by LEDs.

LED lamps can directly replace incandescent lamps such as E26 base lamps. However, in order to replace existing fluorescent lamps with LED lamps, it is necessary to change lamp fixtures or to additionally install a power supply exclusive for LED lamps. Thus, LED fluorescent lamps have not yet been widely distributed.

SUMMARY OF THE INVENTION

The present invention provides a light-emitting diode (LED) fluorescent lamp which is suitable for use, instead of a typical fluorescent lamp, in an existing fluorescent lamp fixture without any requirement for installation of an additional fluorescent lamp ballast exclusively for the LED fluorescent lamp or modification of internal wiring of the fixture.

According to an aspect of the present invention, there is provided a light-emitting diode (LED) lamp comprising a plurality of external connection; an LED array including a plurality of LEDs in series; one or more circuit breakers (e.g., fuse) connected between the LED array and the external connection pins; and one or more capacitors connected in series between the LED array and the external connection pins, wherein the one or more capacitors varying an impedance of the electronic lamp ballast connected to the LED lamp through the external connection pins.

According to an aspect of the present invention, the one or more circuit breakers include at least one of, a first circuit breaker having a first end connected to a first connection pin and a second end connected to an anode terminal of the LED array; and a second circuit breaker having a first end connected to a second connection pin and a second end connected to a cathode terminal of the LED array.

According to another aspect of the present invention, the one or more circuit breakers include at least one of, a first circuit breaker having a first end, which is connected to a first connection pin, and a second end; and a second circuit breaker having a first end, which is connected to a second connection pin, and a second end, and the one or more capacitors include at least one of, a first capacitor having a first end connected to the second end of the first circuit breaker and a second end connected to an anode terminal of the LED array; and a second capacitor having a first end connected to the second end of the second circuit breaker and a second end connected to a cathode terminal of the LED array.

According to another aspect of the present invention, the one or more circuit breakers include at least one of, a first circuit breaker having a first end, which is connected to a first connection pin, and a second end; and a second circuit breaker having a first end, which is connected to a second connection pin, and a second end, the one or more capacitors include at least one of, a first capacitor having a first end which is connected to the second end of the first circuit breaker, and a second end; and a second capacitor having a first end which is connected to the second end of the second circuit breaker, and a second end, and the LED fluorescent lamp further includes at least one of, a first diode having an anode connected to the second end of the first capacitor and a cathode connected to an anode terminal of the LED array; and a second diode having a cathode connected to the second end of the second capacitor and an anode connected to a cathode terminal of the LED array.

According to another aspect of the present invention, the one or more circuit breakers include at least one of, a first circuit breaker having a first end which is connected to a first connection pin, and a second end; and a second circuit breaker having a first end which is connected to a second connection pin, and a second end; a third circuit breaker having a first end which is connected to a third connection pin, and a second end; and a fourth circuit breaker having a first end which is connected to a fourth connection pin, and a second end, the one or more capacitors include at least one of, a first capacitor having a first end which is connected to the second end of the first circuit breaker, and a second end; and a second capacitor having a first end and which is connected to the second end of the second circuit breaker, a second end; a third capacitor having a first end connected to the second end of the third circuit breaker and a second end connected to the anode of the first diode; and a fourth capacitor having a first end connected to the second end of the fourth circuit breaker and a second end connected to the cathode of the first diode, and the LED fluorescent lamp further includes at least one of, a first diode having an anode connected to the second end of the first capacitor and a cathode connected to an anode terminal of the LED array; and a second diode having a cathode connected to the second end of the second capacitor and an anode connected to a cathode terminal of the LED array.

According to another aspect of the present invention, the LED fluorescent lamp further comprises at least one of, a third diode connected in parallel to the first capacitor; a fourth diode connected in parallel to the second capacitor; a fifth diode connected in parallel to the third capacitor; and a sixth diode connected in parallel to the fourth capacitor.

According to another aspect of the present invention, the LED fluorescent lamp further comprises at least one of, a first resistor connected in parallel to the third capacitor; a second resistor connected in parallel to the fourth capacitor; a third resistor connected in parallel to the fifth capacitor; and a fourth resistor connected in parallel to the sixth capacitor.

According to another aspect of the present invention, the LED fluorescent lamp further comprises at least one of, a seventh diode having an anode connected to the anode of the fourth diode and a cathode connected to the anode of the third diode; an eighth diode having an anode connected to the cathode of the fourth diode and a cathode connected to the cathode of the third diode; a ninth diode having an anode connected to the cathode of the sixth diode and a cathode connected to the cathode of the fifth diode; and a tenth diode having an anode connected to the anode of the sixth diode and a cathode connected to the anode of the fifth diode.

According to another aspect of the present invention, the LED fluorescent lamp further comprises at least one of, a seventh diode having an anode connected to the cathode of the fourth diode and a cathode connected to the cathode of the first diode; and an eighth diode having an anode connected to the anode of the second diode and a cathode connected to the cathode of the fifth diode.

According to another aspect of the present invention, the circuit breaker can be a fuse; the electronic fluorescent lamp ballast can be a half-bridge-type fluorescent lamp ballast; and the LED fluorescent lamp comprises a plurality of LED arrays connected in parallel.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

Basic circuitries of electronic fluorescent lamp ballasts can generally be classified into a half bridge-type, an instant start-type and a program start-type. A conventional iron-core based magnetic ballasts can be classified into a starter type and a rapid start type. LED fluorescent lamps according to exemplary embodiments of the present invention can be applied to almost all types of fluorescent lamp ballasts. The structures of the LED fluorescent lamps according to the exemplary embodiments of the present invention and the operations of various types of fluorescent lamp ballasts to which the LED fluorescent lamps according to exemplary embodiments of the present invention are applied will hereinafter be described in detail.

Figure 1:
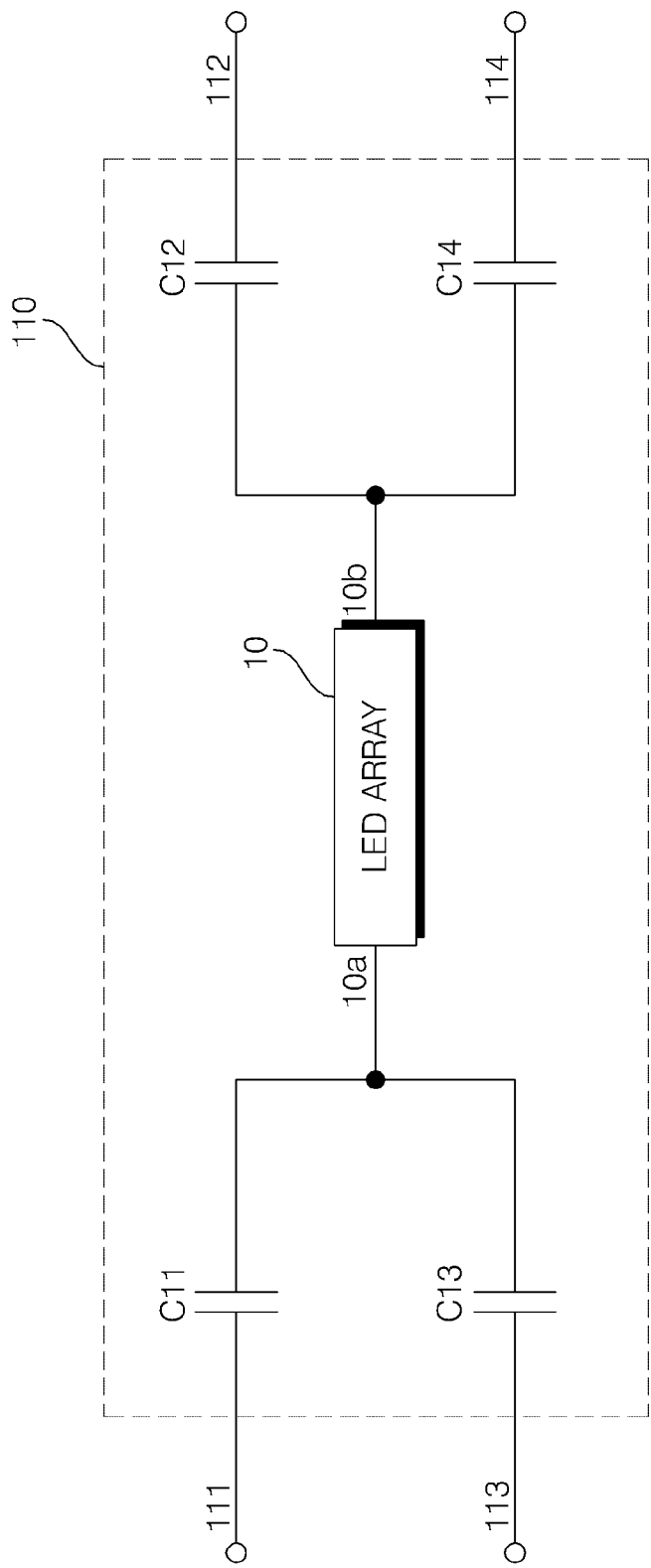
FIG. 1 illustrates a circuit diagram of a light-emitting diode (LED) fluorescent lamp according to a first exemplary embodiment of the present invention.

FIG. 1 illustrates a circuit diagram of an LED fluorescent lamp 110 according to a first exemplary embodiment of the present invention. Referring to FIG. 1, the LED fluorescent lamp 110 may include an LED array 10, a plurality of capacitors C11 through C14, and a plurality of external connection pins, i.e., first 111 through fourth 114. The LED fluorescent lamp 110 may use only two of the first through fourth connection pins 111 through 114. The LED fluorescent lamp 110 may include two or more LED arrays 10 connected in parallel to each other. The structure of the LED fluorescent lamp 110 may be directly applied to LED fluorescent lamps according to other exemplary embodiments of the present invention.

The LED array 10 may include a plurality of LEDs (not shown) connected in series, an anode terminal 10a and a cathode terminal 10b. The capacitor C11 may be connected between the anode terminal 10a and the first connection pin 111, and the capacitor C12 may be connected between the cathode terminal 10b and the second connection pin 112. The capacitor C13 may be connected between the anode terminal 10a and the third connection pin 113, and the capacitor C14 may be connected between the cathode terminal 10a and the fourth connection pin 114.

The capacitors C11 through C14 may be connected to a half-bridge type of electronic ballast circuit via the first through fourth connection pins 111 through 114 and may thus control the operating frequency of the series resonant circuit which is composed of internal inductor and capacitor of the ballast. Due to the variation of the operating frequency of the ballast, the impedance of the inductor inside the ballast can be controlled and, as a result, the amount of current of LED fluorescent lamp 110 can also be controlled. Thus, the basic structure of LED fluorescent lamp 110 may be applied to almost all types of fluorescent lamp ballasts.

Figure 2:
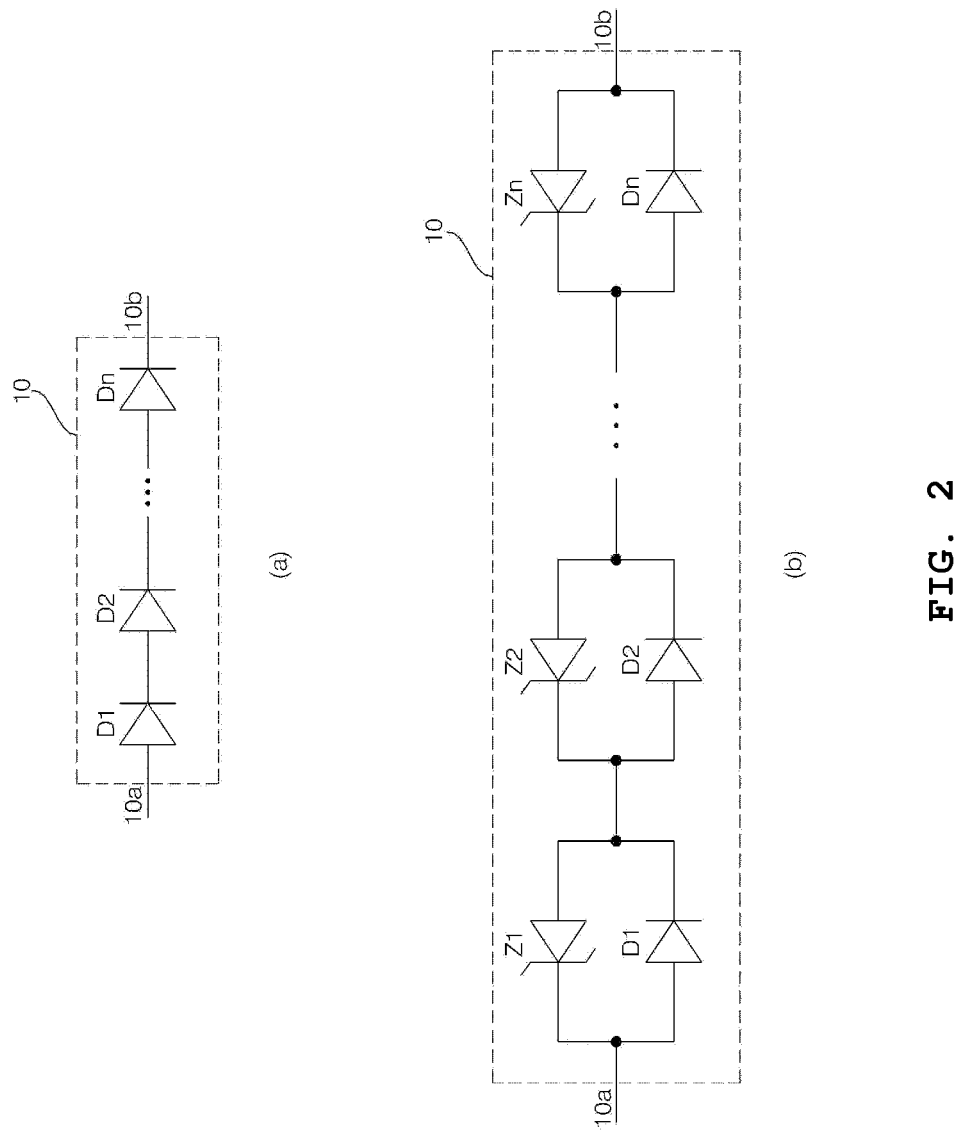
FIG. 2 illustrates a circuit diagram of an LED array shown in FIG. 1.

FIG. 2 illustrates a circuit diagram of the LED array 10 shown in FIG. 1. Referring to FIG. 2(a), the LED array 10 may include a plurality of LEDs D1 through Dn connected in series. In order to protect the LEDs D1 through Dn, the LED array 10 may also include a plurality of zener diodes Z1 through Zn connected in parallel to the LEDs D1 through Dn, respectively, in an opposite direction to the direction in which the LEDs D1 through Dn are aligned, as shown in FIG. 2(b). Referring to FIG. 2(b), if the applied voltage at 10a is positive with respect to 10b, a current may flow through the LEDs D1 through Dn. On the other hand, during a negative period of the input AC voltage, a current may flow through the zener diodes Z1 through Zn. The flow of a current through the zener diodes Z1 through Zn may become an ineffective loss. Therefore, in order to prevent the flow of a reverse current through the zener diodes Z1 through Zn and thus to improve efficiency, various modifications may be made to the first exemplary embodiment, and this will hereinafter be described in detail.

Figure 3:
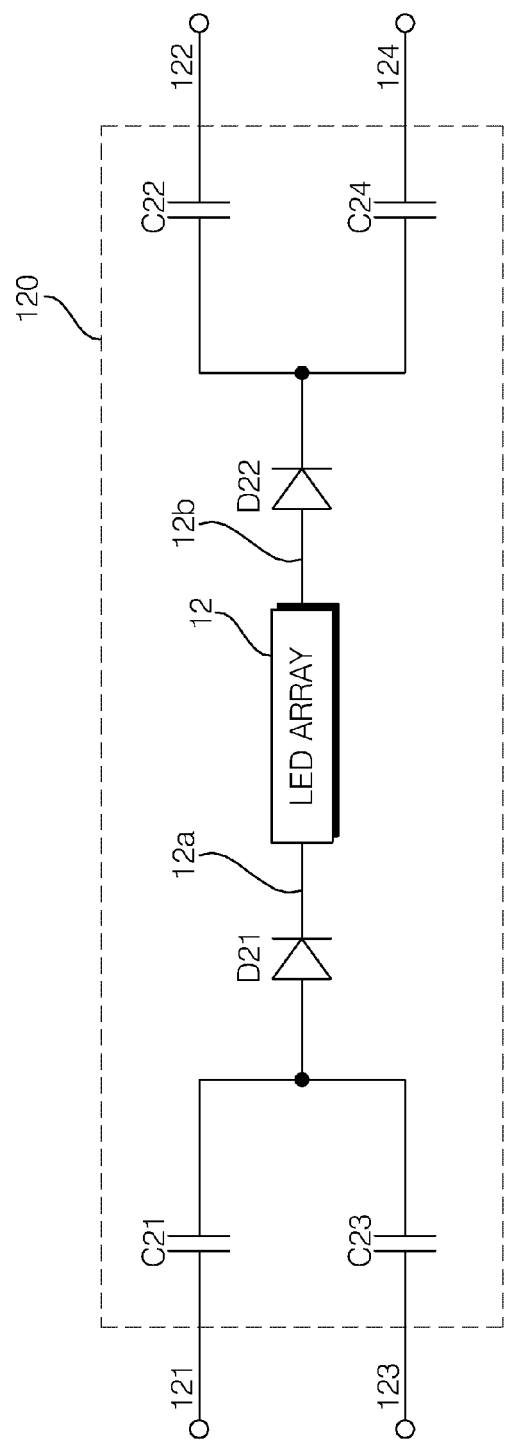
FIG. 3 illustrates a circuit diagram of an LED fluorescent lamp according to a second exemplary embodiment of the present invention.

FIG. 3 illustrates a circuit diagram of an LED fluorescent lamp 120 according to a second exemplary embodiment of the present invention. The second exemplary embodiment is the same as the first exemplary embodiment except that the LED fluorescent lamp 120 includes two diodes D21 and D22 connected in series to either end of an LED array 12. The LED fluorescent lamp 120 may include only one of the diodes D21 and D22. The diodes D21 and D22 may allow a current to flow in the LED array 12 only in a forward direction. Therefore, even if the LED array 12 includes a plurality of zener diodes (not shown) connected in parallel to LEDs, it is possible to prevent power loss that may be caused by a current flown through the zener diodes during a negative period of an input AC voltage.

Figure 4:
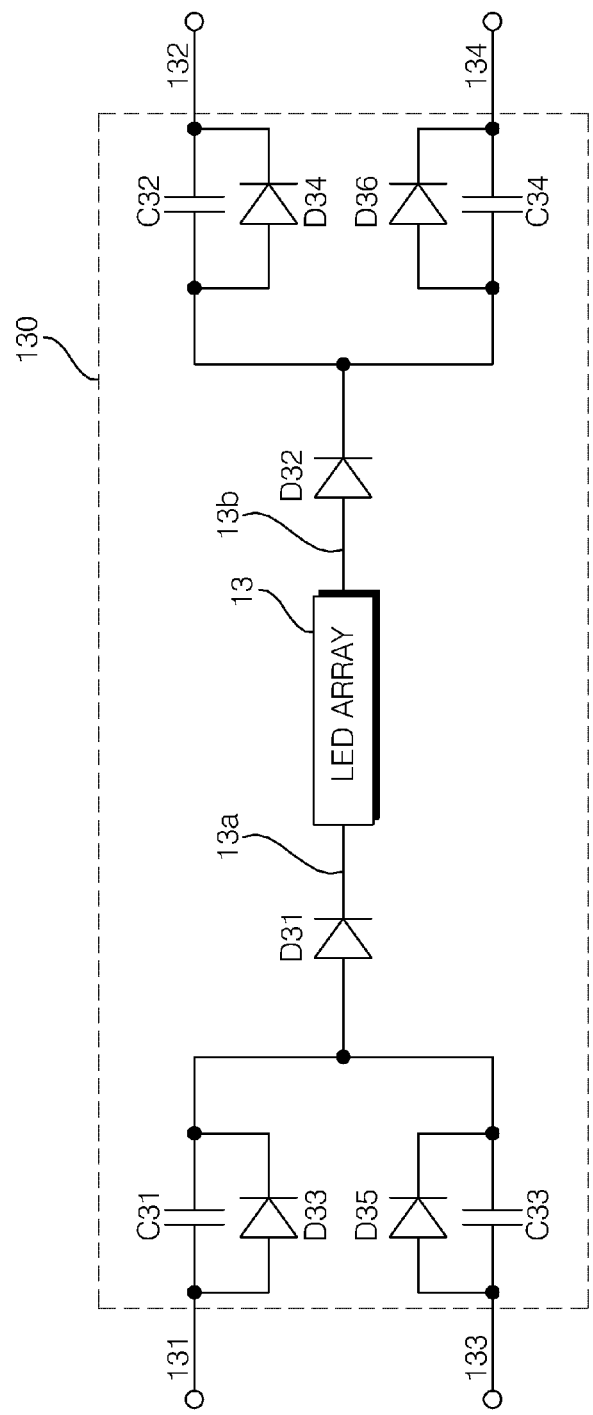
FIG. 4 illustrates a circuit diagram of an LED fluorescent lamp according to a third exemplary embodiment of the present invention.
Figure 12:
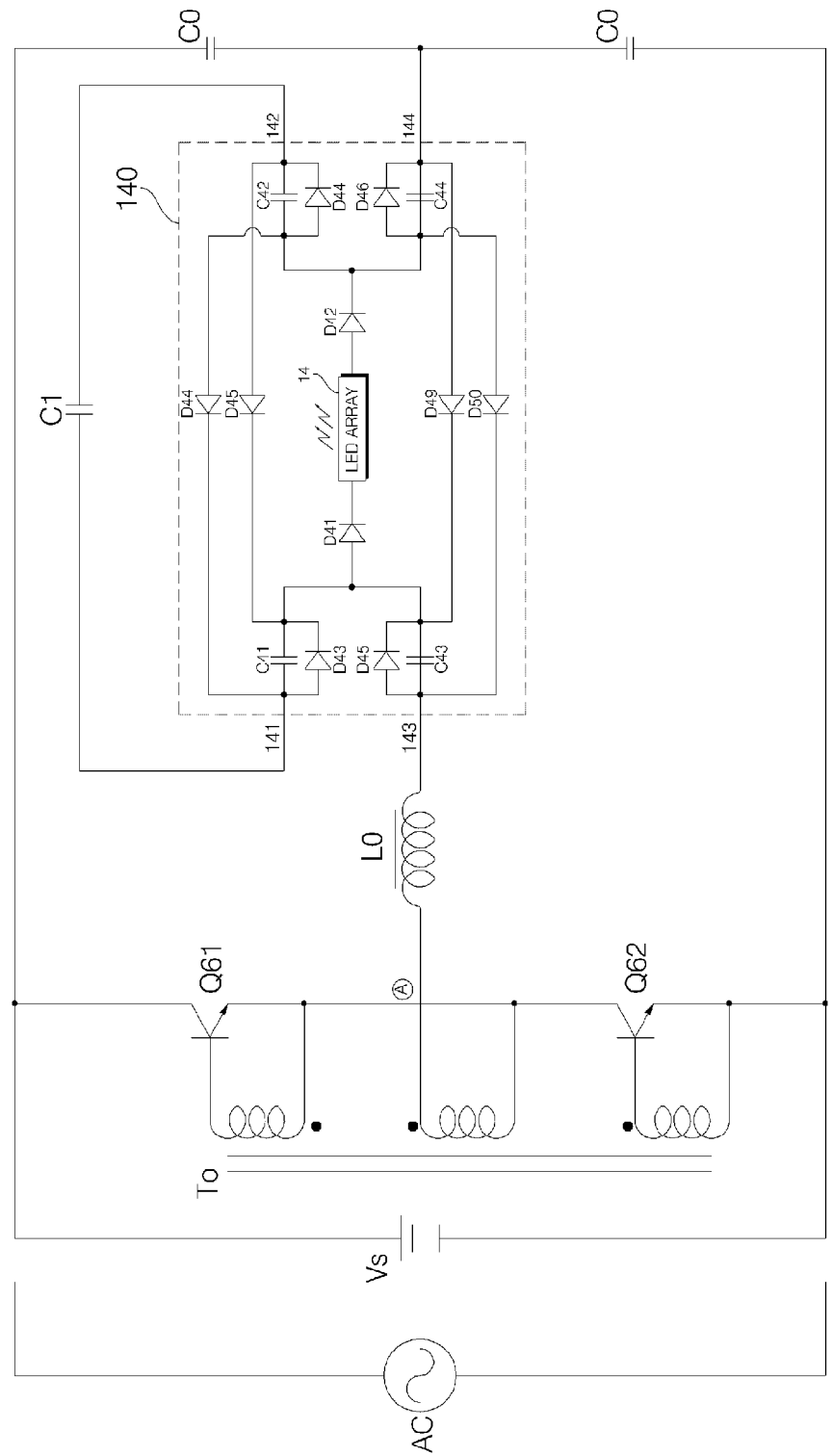
FIG. 12 illustrates a circuit diagram of a half-bridge-type electronic fluorescent lamp ballast to which the LED fluorescent lamp of the fourth exemplary embodiment is applied.

FIG. 4 illustrates a circuit diagram of an LED fluorescent lamp 130 according to a third exemplary embodiment of the present invention. Referring to FIG. 4, the LED fluorescent lamp 130 may include an LED array 13, first through fourth connection pins 131 through 134, a plurality of capacitors C31 through C34 connected to the first through fourth connection pins 131 through 134, respectively, and a plurality of diodes D33 through D36 connected in parallel to the capacitors C31 through C34, respectively. If the output terminals of a series-resonant type of electronic ballast is connected to the connection pin pairs (131 and 133) and (132 and 134) and a series-resonance sustain capacitor inside the electronic ballast is connected between the first and second connection pins 131 and 132 or between the third and fourth connection pins 133 and 134 as shown in FIG. 12, the flow of a current in the LED array 13 may be controlled by the diodes D33 through D36 according to the polarity of an input voltage provided by the electronic ballast. For example, if a positive voltage is applied to the third connection pin 133 when the connection pin 134 is set as a reference point and the series-resonance sustain capacitor is connected between the first and second connection pins 131 and 132, the capacitor C33 may become short-circuited by the diode D35, the diodes D33 and D34 may become open, and the capacitor C34 may become short-circuited by the diode D36. In this case, the initial resonant capacitance of the electronic ballast may be equal to the total capacitance of the capacitor C31, the series-resonance sustain capacitor C1 and the capacitor C32 in series and the resonant frequency of the ballast may be changed by the variation of the resonant capacitance. In addition, if a negative voltage is applied to the third connection pin 133, the capacitor C32 may become short-circuited by the diode D34, and the capacitor C31 may be short-circuited by the diode D33. In this case, the total capacitance of the electronic ballast may be equal to the total capacitance of the capacitor C34, the series-resonance sustain capacitor C1 and the capacitor C33 in series.

Figure 5:
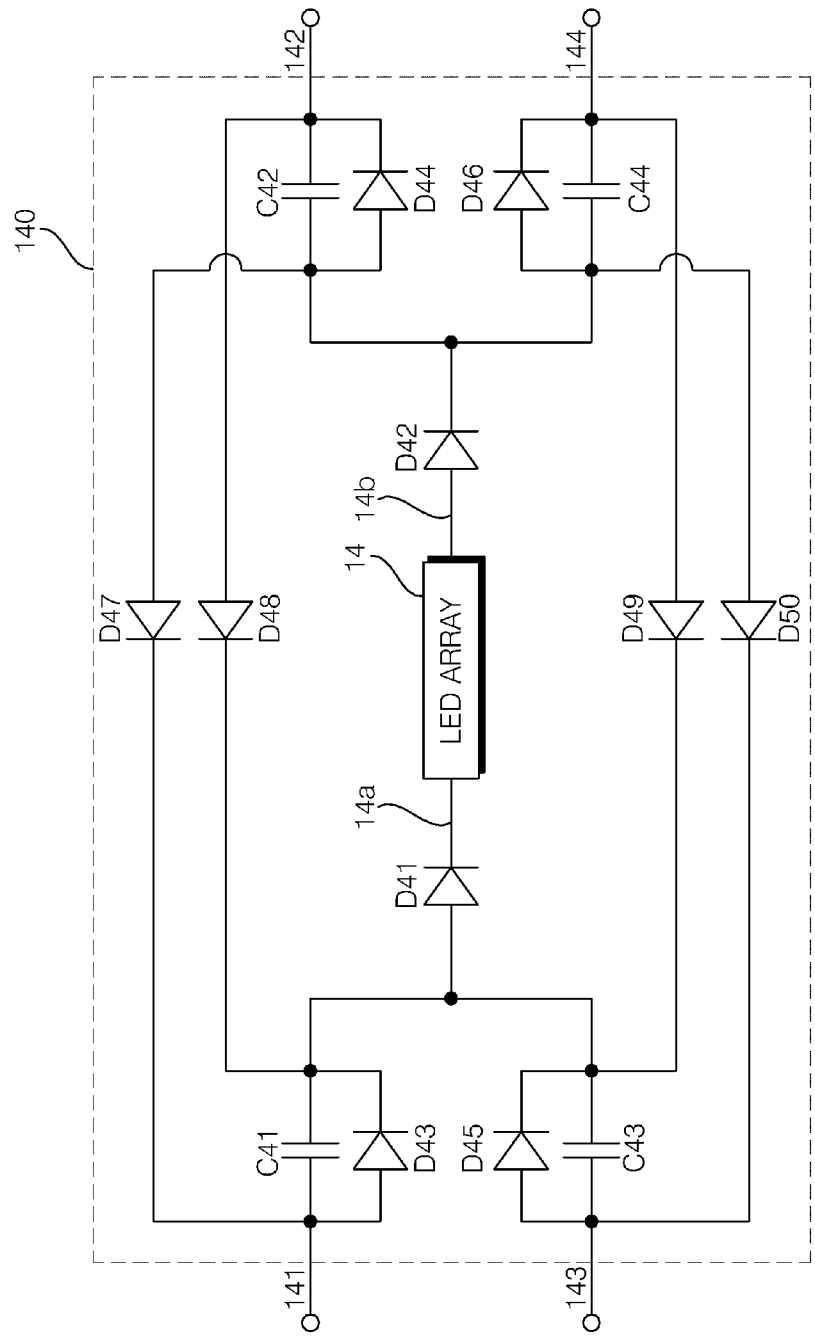
FIG. 5 illustrates a circuit diagram of an LED fluorescent lamp according to a fourth exemplary embodiment of the present invention.

FIG. 5 illustrates a circuit diagram of an LED fluorescent lamp 140 according to a fourth exemplary embodiment of the present invention. The fourth exemplary embodiment is the same as the third exemplary embodiment except that the LED fluorescent lamp 140 also includes a plurality of diodes D47 through D50. Thus, the LED fluorescent lamp may be able to stably operate keeping the characteristics of symmetric operation regardless of variations in the phase of a voltage applied thereto by a fluorescent lamp ballast.

Figure 6:
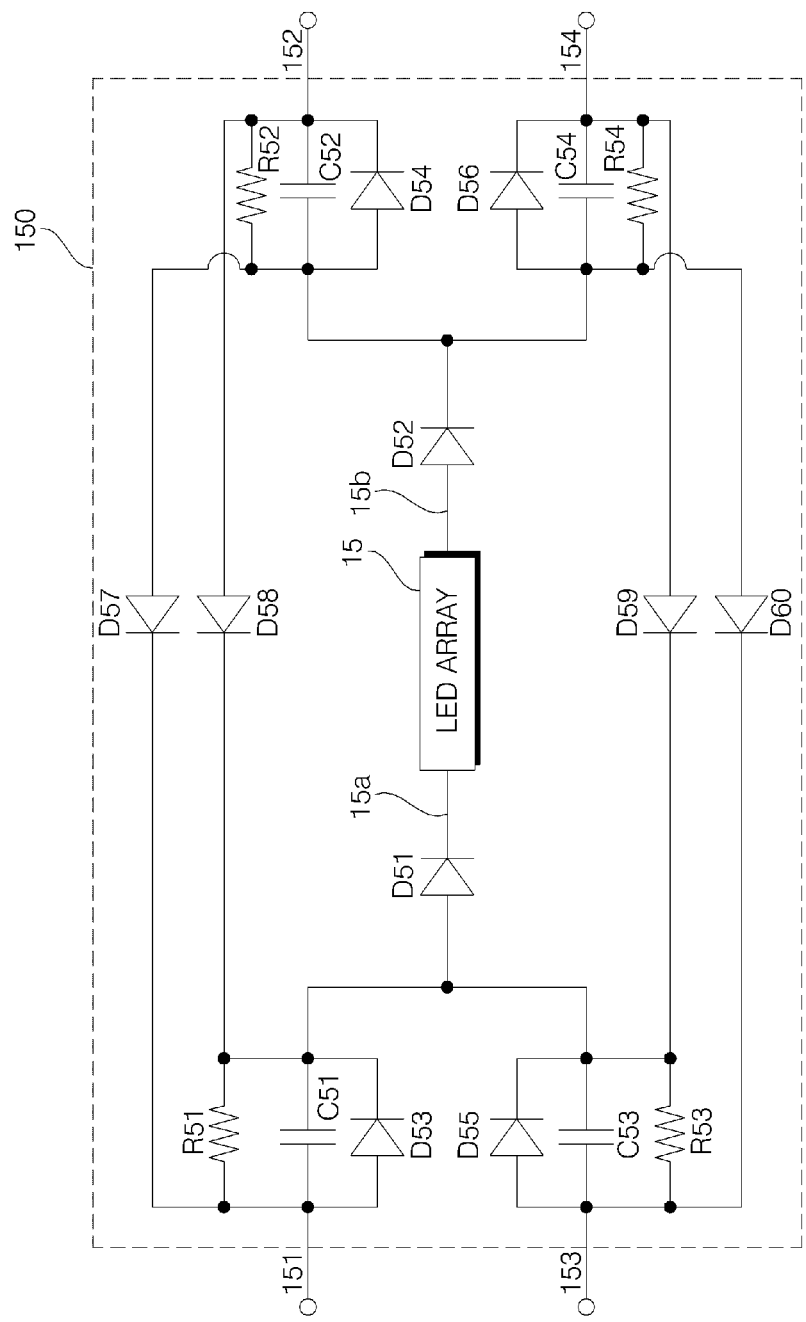
FIG. 6 illustrates a circuit diagram of an LED fluorescent lamp according to a fifth exemplary embodiment of the present invention.

FIG. 6 illustrates a circuit diagram of an LED fluorescent lamp 150 according to a fifth exemplary embodiment of the present invention. Referring to FIG. 6, the LED fluorescent lamp 150 may include an LED array 15, first through fourth connection pins 151 through 154, a plurality of capacitors C51 through C54 connected to the first through fourth connection pins 151 through 154, respectively, a plurality of diodes D53 through D56 connected in parallel to the capacitors C51 through C54, respectively, and a plurality of resistors R51 through R54 connected in parallel to the capacitors C51 through C54, respectively, for applying a current for an initial trigger operation of the ballast.

Figure 7:
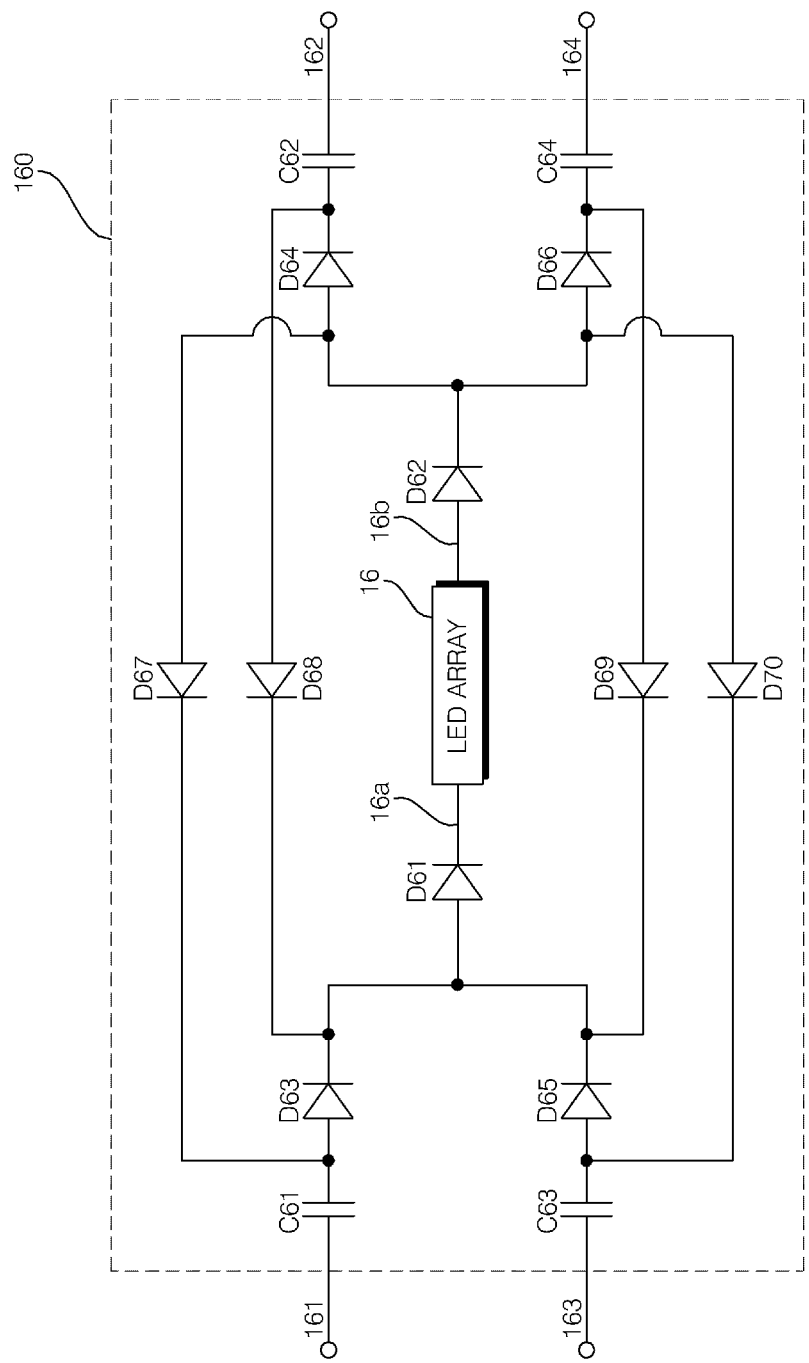
FIG. 7 illustrates a circuit diagram of an LED fluorescent lamp according to a sixth exemplary embodiment of the present invention.

FIG. 7 illustrates a circuit diagram of an LED fluorescent lamp 160 according to a sixth exemplary embodiment of the present invention. Referring to FIG. 7, the LED fluorescent lamp 160 may include an LED array 16, first through fourth connection pins 161 through 164, a plurality of capacitors C61 through C64 connected to the first through fourth connection pins 161 through 164, respectively, and a plurality of diodes D63 through D66 connected in series to the capacitors C61 through C64, respectively. The diodes D63 through D66 and a plurality of diodes D67 through D70 may allow the LED fluorescent lamp 160 to stably operate keeping the characteristics of symmetric operation regardless of the phase of an AC voltage applied by a fluorescent lamp ballast.

Figure 8:
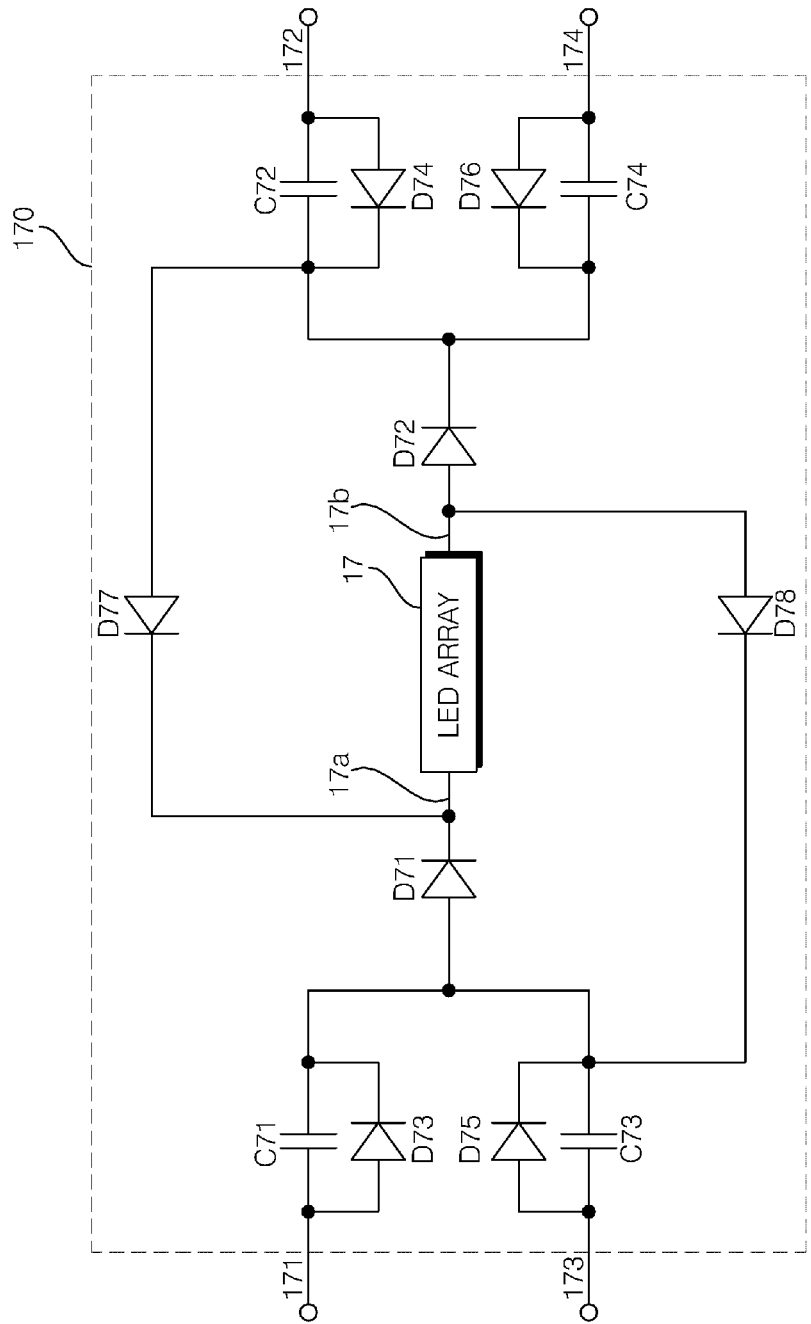
FIG. 8 illustrates a circuit diagram of an LED fluorescent lamp according to a seventh exemplary embodiment of the present invention.

FIG. 8 illustrates a circuit diagram of an LED fluorescent lamp 170 according to a seventh exemplary embodiment of the present invention. Referring to FIG. 8, the anode of a diode D73 may be connected to a first connection pin 171, and the cathode of the diode D73 may be connected to the anode of a diode D71. The anode of a diode D74 may be connected to a second connection pin 172, and the cathode of the diode D74 may be connected to the cathode of a diode D72. The anode of a diode D75 may be connected to a third connection pin 173, and the cathode of the diode D75 may be connected to the anode of the diode D71. The anode of a diode D76 may be connected to a fourth connection pin 174, and the cathode of the diode D76 may be connected to the cathode of the diode D72. The anode of the diode D77 may be commonly connected to the cathode of the diode D72 and second ends of capacitors C72 and C74, and the cathode of the diode D77 may be connected to an anode terminal 17a of an LED array 17.

The anode of the diode D78 may be connected to a cathode terminal 17b of the LED array 17, and the cathode of the diode D78 may be commonly connected to the anode of the diode D71 and second ends of capacitors C71 and C73.

The diodes D77 and D78 may allow the LED fluorescent lamp 170 to stably operate keeping the characteristics of symmetric operation regardless of variations in the phase of a voltage applied to the first through fourth connection pins 171 through 174 by a fluorescent lamp ballast.

Figure 9:
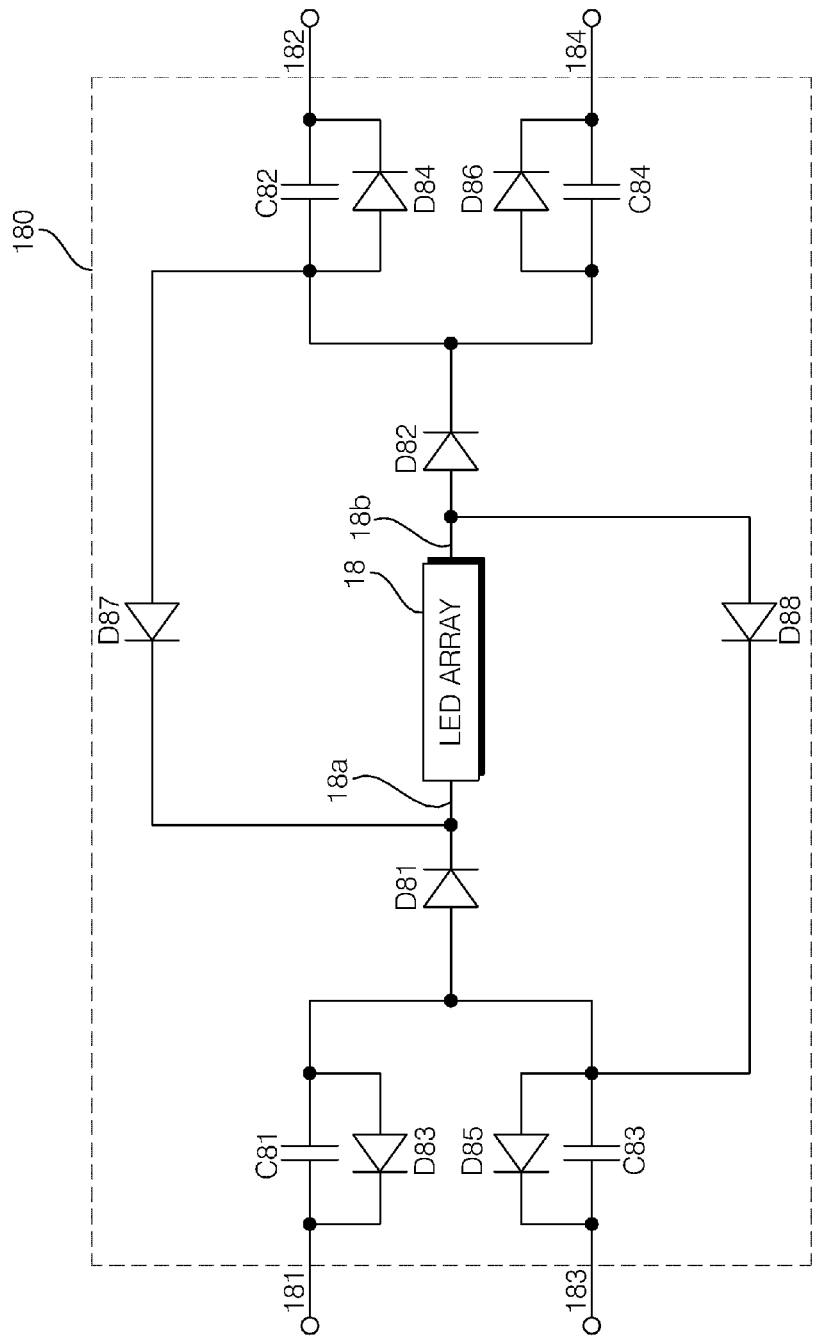
FIG. 9 illustrates a circuit diagram of an LED fluorescent lamp according to an eighth exemplary embodiment of the present invention.

FIG. 9 illustrates a circuit diagram of an LED fluorescent lamp 180 according to an eighth exemplary embodiment of the present invention. The eighth exemplary embodiment is the same as the seventh exemplary embodiment except for the reverse direction of diodes D83 through D86 which are connected in parallel to a plurality of capacitors C81 through C84, respectively.

Figure 10:
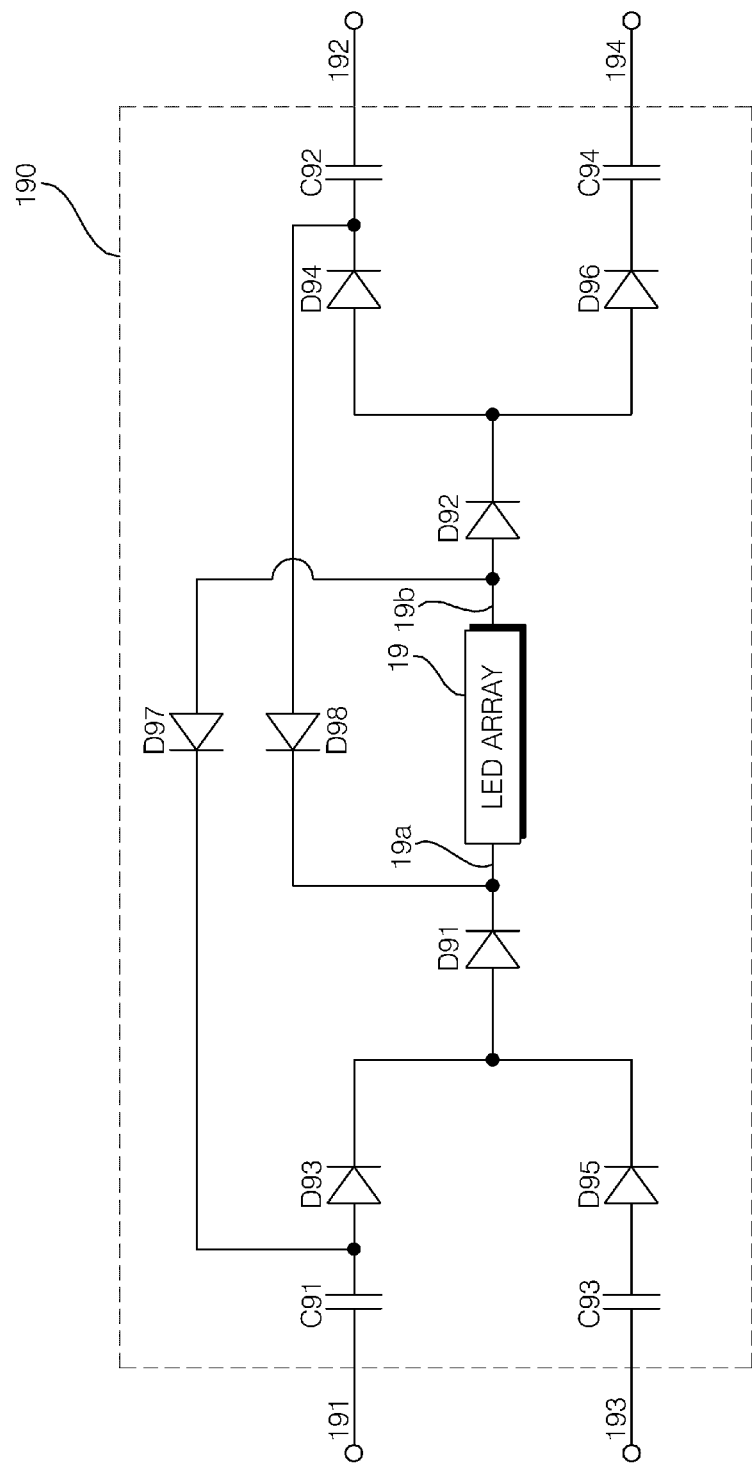
FIG. 10 illustrates a circuit diagram of an LED fluorescent lamp according to a ninth exemplary embodiment of the present invention.

FIG. 10 illustrates a circuit diagram of an LED fluorescent lamp 190 according to a ninth exemplary embodiment of the present invention. Referring to FIG. 10, the LED fluorescent lamp 190 may include first through fourth connection pins 191 through 194, a plurality of capacitors C91 through C94 connected to the first through fourth connection pins 191 through 194, respectively, and a plurality of diodes D93 through D96 connected in series to the capacitors C91 through C94, respectively. The LED fluorescent lamp 190 may also include a diode D97 having an anode connected to a second end of an LED array 19 and a cathode connected to the anode of the diode D93 and a diode D98 having an anode connected to the cathode of the diode D94 and a cathode connected to a first end of the LED array 19.

The diodes D93 through D98 may allow the LED fluorescent lamp 190 to operate in various types of fluorescent lamp ballasts regardless of the phase of an AC voltage.

Figure 11:
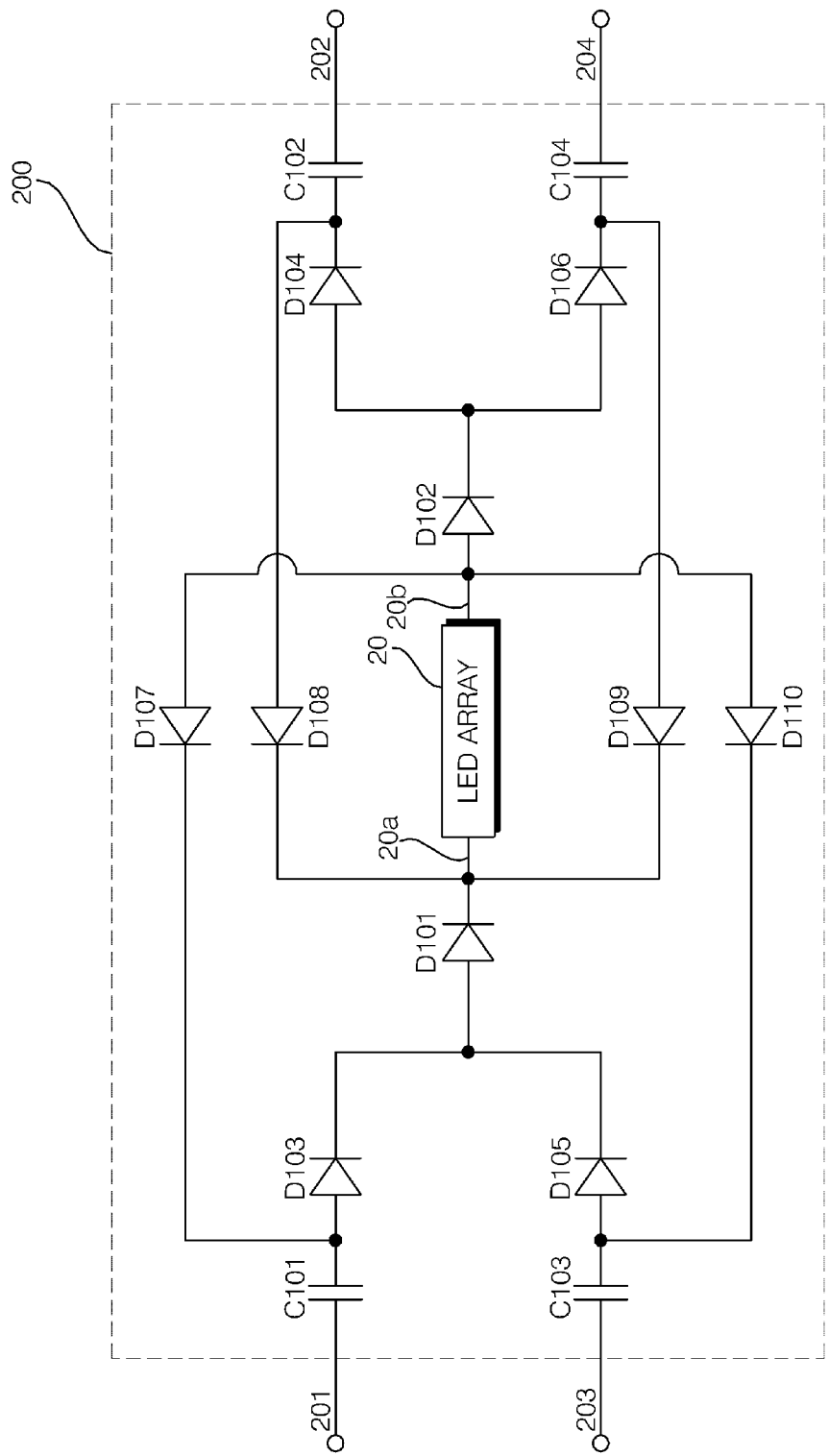
FIG. 11 illustrates a circuit diagram of an LED fluorescent lamp according to a tenth exemplary embodiment of the present invention.

FIG. 11 illustrates a circuit diagram of an LED fluorescent lamp 200 according to a tenth exemplary embodiment of the present invention. The LED fluorescent lamp 200 is almost the same as the LED fluorescent lamp 190 shown in FIG. 10 except that it also includes diodes D109 and D110. More specifically, referring to FIG. 11, the anode of the diode D109 may be connected to the cathode of a diode D106, and the cathode of the diode D109 may be connected to a first end of an LED array 20. The anode of the diode D110 may be connected to a second end of the LED array 20, and the cathode of the diode D110 may be connected to the anode of the diode D105. The diodes D109 and D110 may allow the LED fluorescent lamp 200 to operate symmetrically in response to a voltage applied thereto by an external voltage source.

The basic structures of the LED fluorescent lamps 110 through 200 of the first through tenth exemplary embodiments can be applied to nearly most types of fluorescent lamp ballasts. The operations of various types of fluorescent lamp ballasts will hereinafter be described in detail, taking the LED fluorescent lamps 140, 160, 170, 190 and 200 of the fourth, sixth, seventh, ninth and tenth exemplary embodiments as an example.

FIG. 12 illustrates a circuit diagram of a half-bridge-type of fluorescent lamp ballast to which the LED fluorescent lamp 140 of the fourth exemplary embodiment is applied.

In a half-bridge type of electronic fluorescent lamp ballast, a series-resonant circuit including an inductor and a capacitor may be connected to a switching output node of a half-bridge inverter composed of a semiconductor switching device. The half-bridge type of electronic ballast may initially ignite a fluorescent lamp using a series-resonance voltage applied to either end of the resonant capacitor. Once the fluorescent lamp is discharged, the main current flown in the fluorescent lamp will be controlled by the impedance of an inductor of the series-resonant circuit. Referring to FIG. 12, the resonant frequency of a series-resonant circuit and the operating frequency of switching devices Q61 and Q62 may be synchronized with each other by a current transformer To. Power consumption Ps may be defined by Equation (1):

$$Ps \approx Is Vs \qquad (1)$$

where, Vs indicates a direct current (DC) input voltage and Is indicates an average current applied to an inverter.

A load current may be the same as the average current Is. Thus, if C0>>C1, C0>>C41~C44, and if we let the total capacitance of the LED lamp (140) with the capacitor C1 inside the ballast to Ca then the average current Is may be defined using Equations (2) through (4):

$$Is \simeq fCQ_0Vs; \qquad (2)$$

$$C = \frac{2C_0C_a}{C_a + 2C_0} \simeq C_a; \qquad (3)$$

and $$Q_0 = \frac{1}{R_0}\sqrt{L_0/C} \qquad (4)$$

where, f indicates the operating frequency of the switching devices Q61 and Q62 and Ro indicates the internal resistance of the LED fluorescent lamp 140 when the LED fluorescent lamp 140 is operating at a resonant frequency.

An operating frequency f of an inverter may be defined by Equations (5):

$$f = \frac{\omega}{2\pi} = \frac{\omega_0}{2\pi}\sqrt{1 - 1/4Q_0^2} \qquad (5)$$
$$\omega_0 = 1/\sqrt{L_0 C}.$$

Therefore, the average current Is may be calculated using Equations (2) and (5), as indicated by Equation (6):

$$I_S \simeq \frac{1}{2\pi}\omega_0 C Q_0 V_s \sqrt{1 - 1/4Q^2} \qquad (6)$$
$$\simeq \frac{Q_0 V_S}{2\pi Z}\sqrt{1 - 1/4Q^2};$$

where Z indicates impedance. The impedance Z may be defined by Equation (7):

$$Z = \omega_0 L_0 = \frac{1}{\omega_0 C} = \sqrt{L_0/C}. \qquad (7)$$

If C0>>C1, the operating frequency f may be determined by the total capacitance Ca. Therefore, once the LED fluorescent lamp 140 is connected to a half-bridge type of electronic ballast, the half-bridge invel1er may operate as follows. Referring to FIG. 12, at initial resonance stage, if the switching device Q61 is turned on and thus the voltage Vs is applied to a node A, a resonance current may flow, sequentially passing through Lo, D45, C41, C1, C42, D46, and 2Co. On the other hand, if the switching device Q62 is turned on, the voltage at the node A may become a ground voltage, and the resonance current may flow along an opposite path to the path of the resonant current, 2Co, C44, D44, C1, D43, C43 and Lo.

To guarantee the general usage of the LED fluorescent lamp 140, the basic structure of LED fluorescent lamp 140 must be symmetrical. Thus, the first through fourth connection pins 141 through 144 of the LED fluorescent lamp 140 must not have any polarity. Therefore, at series-resonant condition, if C41=C42=C43=C44=C2, the total capacitance Ca may be defined by Equation (8):

$$C_a = \frac{C_1 C_2}{2C_1 + C_2}. \qquad (8)$$

Therefore, if $C_2$>>$C_1$, Ca≈$C_2$/2 and the impedance Z may increase. Accordingly, a current flown in the LED fluorescent lamp 140 may decrease, and thus, it is possible to properly control the current flown in the LED fluorescent lamp 140. Thus, it is possible to install the LED fluorescent lamp 140 in a half-bridge type of electronic fluorescent lamp ballast without the need to re-wiring the fluorescent lamp fixture.

Figure 13:
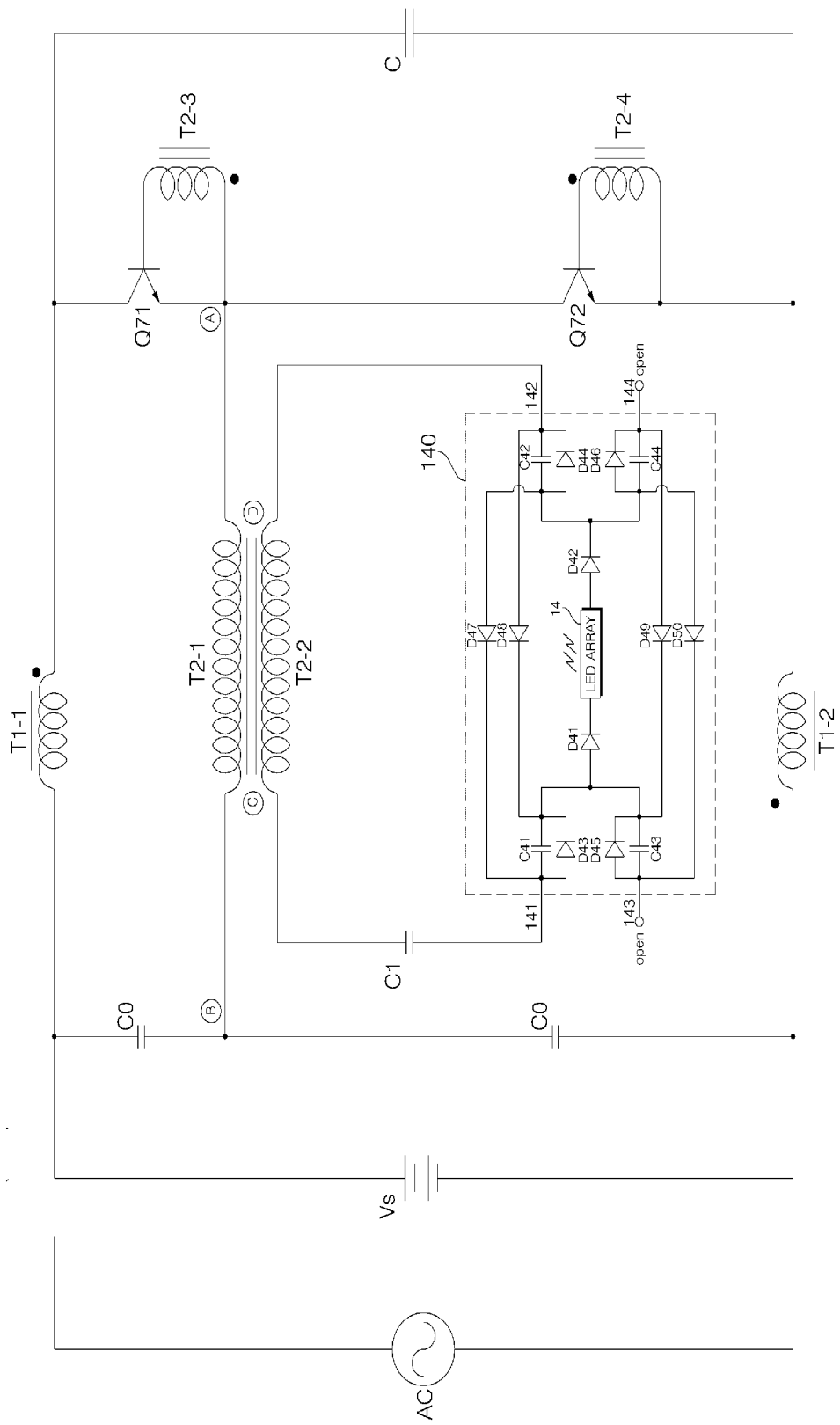
FIG. 13 illustrates a circuit diagram of an instant start-type electronic fluorescent lamp ballast to which the LED fluorescent lamp of the fourth exemplary embodiment is applied.

FIG. 13 illustrates a circuit diagram of an instant start-type electronic fluorescent lamp ballast to which the LED fluorescent lamp 140 of the fourth exemplary embodiment is applied. Referring to FIG. 13, due to a self-oscillation operation of a circuit including transformers T1 and T2 and a capacitor C, switching devices Q71 and Q72 may be able to continue a switching operation. The transformer T2 may be connected between a switching node A and a node B by a primary winding T2-1. The instant start-type of electronic fluorescent lamp ballast may initially discharge the fluorescent lamp using a high voltage induced to a secondary winding T2-2 of the transformer T2. Once the fluorescent lamp is discharged, the instant start-type of electronic ballast may control the stabilization current with the use of a capacitor C1, which is connected in series to a lamp load.

The operation of the instant start-type of electronic ballast operating with LED fluorescent lamp 140 will hereinafter be described in further detail. The transformer T2 may resonate with the self-oscillation frequency and may thus induce a high AC voltage to the secondary winding T2-2. If the voltage at the node C is positive with respect to the voltage at the node D, a current may flow, sequentially passing through the node C, the capacitor C, the diode D43, the diode D41, the LED array 14, the diode D42, the diode D44 and the node D. On the other hand, if the voltage at the node C is negative with respect to the voltage at the node D, a current may flow, sequentially passing through the node D, the diode D48, the diode D41, the LED array 14, the diode D42, the diode D47, the capacitor C1 and the node C. Alternatively, a current may flow, sequentially passing through the node D, the capacitor C42, the diode D47, the capacitor c, and the node C or the node D, the diode D48, the capacitor C41, the capacitor C 1, and the node C depending upon the total number of LEDs.

Therefore, the main current flown in the LED array 14 may be controlled by the value of the impedance of the capacitor C1, that is, 1/jωC1 of the instant start-type ballast and the total number of series-connected LEDs of LED array 14.

Figure 14:
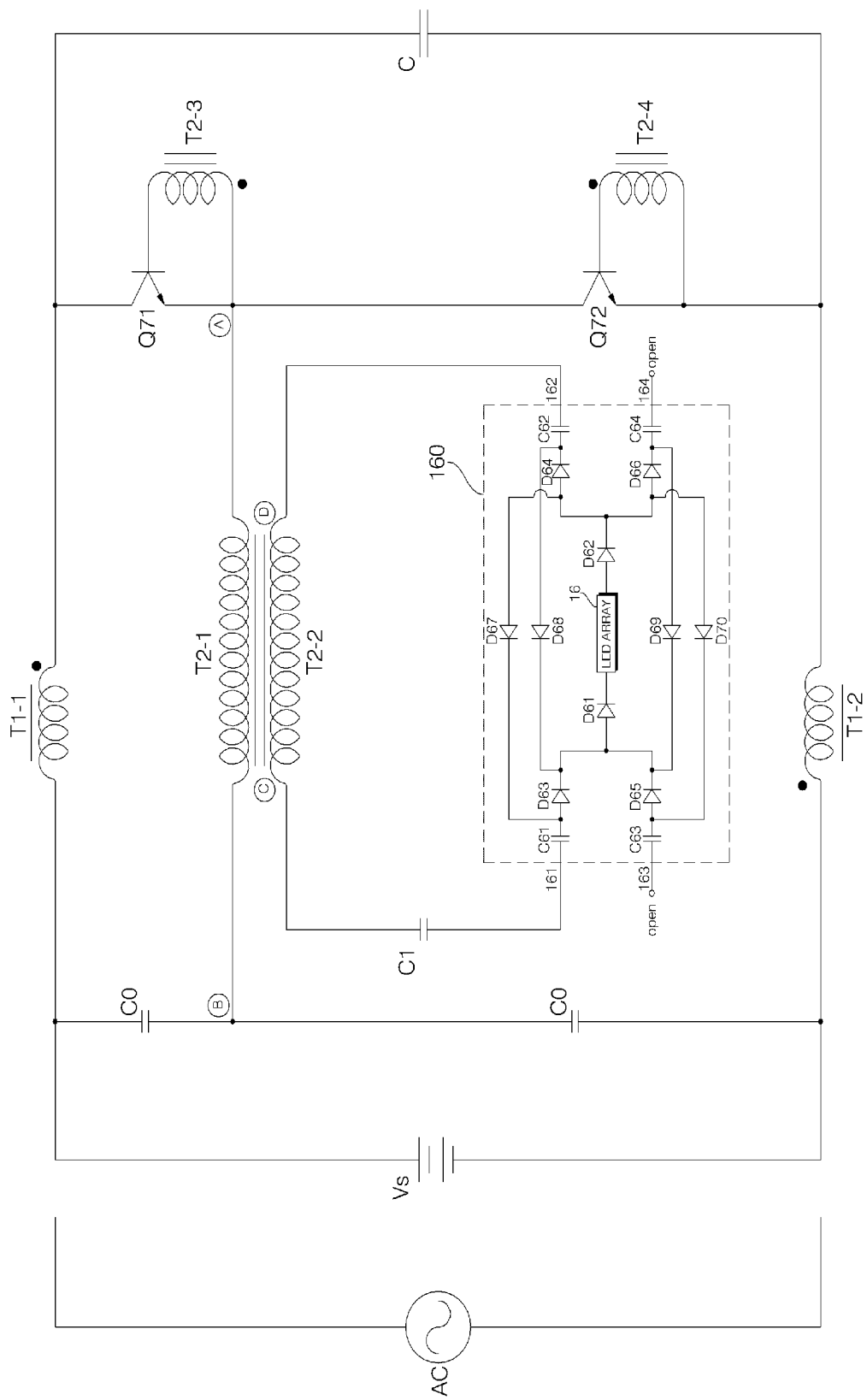
FIG. 14 illustrates a circuit diagram of an instant start-type electronic fluorescent lamp ballast to which the LED fluorescent lamp of the sixth exemplary embodiment is applied.

FIG. 14 illustrates a circuit diagram of an instant start-type electronic fluorescent lamp ballast to which the LED fluorescent lamp 160 of the sixth exemplary embodiment is applied. Referring to FIG. 14, when the instant start-type electronic fluorescent lamp ballast is connected to the first and second connection pins 161 and 162 of the LED fluorescent lamp 160, a transformer T2 may resonate with self-oscillation frequency and may thus induce a high AC voltage to a secondary winding T2-2. If the voltage at the node C is positive with respect to the voltage at the node D, a current may flow, sequentially passing through the node C, the capacitor C1, the capacitor C61, the diode D63, the diode D61, the LED array 16, the diode D62, the diode D64, the capacitor C62 and the node D with a phase being shifted by π/2 by the capacitance of the capacitors C61 through C64.

On the other hand, if the voltage at the node C is negative with respect to the voltage at the node D, a current may flow, sequentially passing through the node D, the capacitor C62, the diode D68, the diode D61, the LED array 16, the diode D62, the diode D67, the capacitor C61, the capacitor C 1 and the node C with a phase being shifted by π/2 by the capacitance of the capacitors C61 through C64.

Therefore, the main current flown in the LED array 16 may be controlled by the total composite impedance of the series-connected capacitors C, C61 and C62. Therefore, it is possible to control a current flown in an LED array load by varying the capacitances of the capacitors C61 and C62 in the LED fluorescent lamp 160.

If we let C61=C62=C2, the composite impedance Z may be defined by Equation (9):

$$Z = -j\frac{1}{\omega C_1} - j\frac{2}{\omega C_2}. \qquad (9)$$

The third and fourth connection pins 163 and 164 of the LED fluorescent lamp 160 may be provided in order to make the LED fluorescent lamp 160 operate symmetrically not having any polarity. The operation of an instant start-type electronic fluorescent lamp ballast when the ballast is connected to the third and fourth connection pins 163 and 164 may be basically the same as the operation when the ballast is connected to the first and second connection pins 161 and 162.

Figure 15:
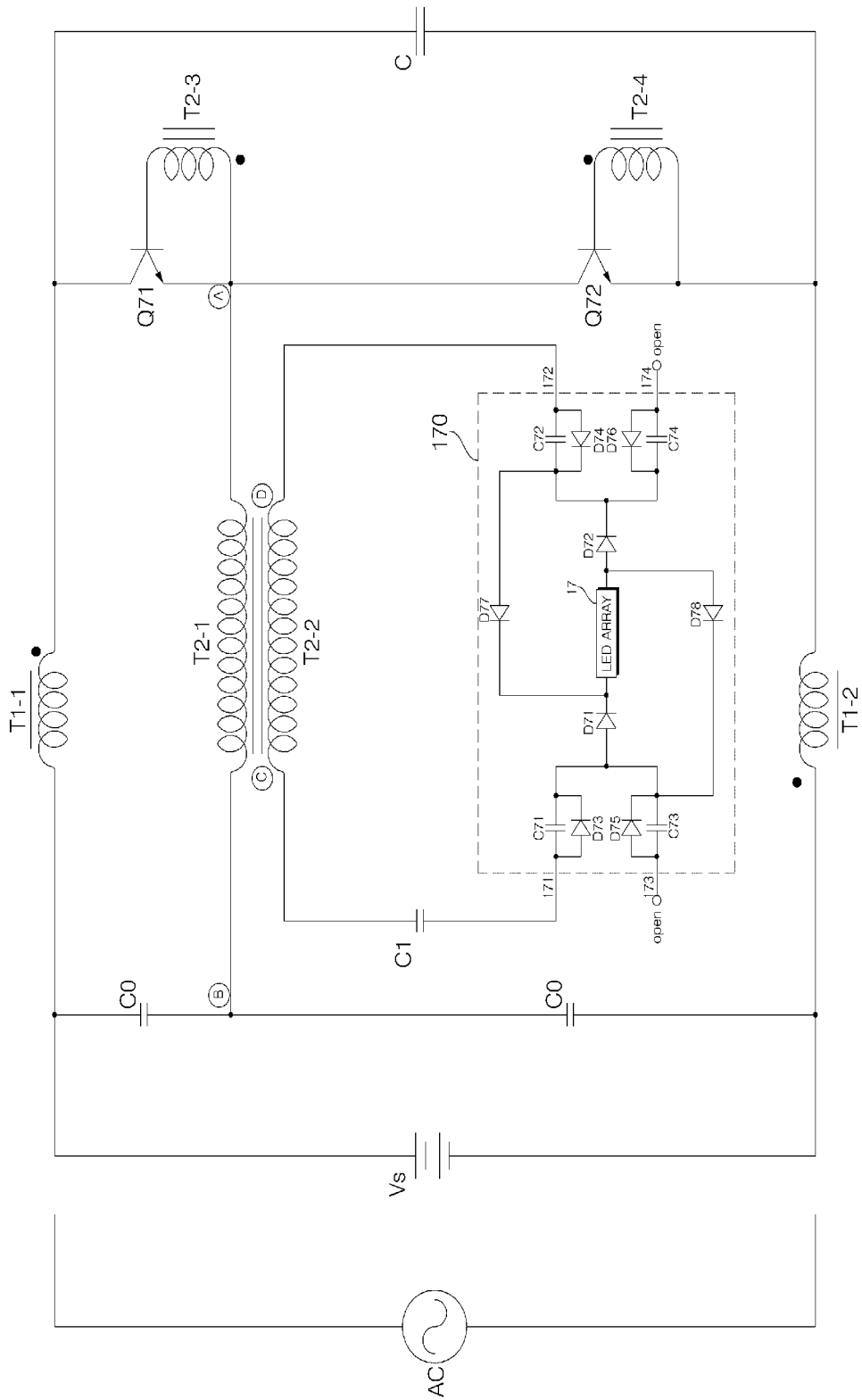
FIG. 15 illustrates a circuit diagram of an instant start-type electronic fluorescent lamp to which the LED fluorescent lamp of the seventh exemplary embodiment is applied.

FIG. 15 illustrates a circuit diagram of an instant start-type electronic fluorescent lamp ballast to which the LED fluorescent lamp 170 of the seventh exemplary embodiment is applied. Referring to FIG. 15, switching devices Q71 and Q72 continue a switching operation by the self-oscillation operation of the circuit composed of transformers T1, T2 and a capacitor C. Primary winding T2-1 of the transformer T2 is connected between the switching point A and the center point of the series-connected capacitors Co and a high AC voltage may be induced at the secondary winding T2-2. If the voltage at the node C is positive with respect to the voltage at the node D, a current may flow, sequentially passing through the node C, the capacitor C1, the diode D73, the diode D71, the LED array 17, the diode D72, the capacitor C72 and the node D. On the other hand, if the voltage at the node C is negative with respect to the voltage at the node D, a current may flow, sequentially passing through the node D, the diode D74, the diode D77, the LED array 17, the diode D78, the capacitor C71, the capacitor C1 and the node C.

The operation of an instant start-type electronic fluorescent lamp ballast to which the LED fluorescent lamp 180 shown in FIG. 9 is applied is almost the same as the operation of the instant start-type electronic fluorescent lamp ballast shown in FIG. 15. More specifically, in the instant start-type electronic fluorescent lamp ballast having the LED fluorescent lamp 180, if a positive voltage is applied to the first connection pin 181 of the LED fluorescent lamp 180 and a negative voltage is applied to the second connection pin 182 of the LED fluorescent lamp, i.e., if the voltage at a node C is positive with respect to the voltage at a node D, a current may flow, sequentially passing through the node C, the capacitor C1, the capacitor C81, the diode D81, the LED array 18, the diode D82, the diode D84 and the node D. On the other hand, if a negative voltage is applied to the first connection pin 181 and a positive voltage is applied to the second connection pin 182, i.e., if the voltage at the node C is negative with respect to the voltage at the node D, a current may flow, sequentially passing through the node D, the capacitor C82, the diode D87, the LED array 18, the diode D88, the diode D83, the capacitor C1 and the node C.

In short, the operation of an instant start-type electronic fluorescent lamp ballast to which the LED fluorescent lamp 180 of the eighth exemplary embodiment is applied is almost the same as the operation of an instant start-type electronic fluorescent lamp ballast to which the LED fluorescent lamp 170 of the seventh exemplary embodiment is applied, except for the path of a current.

Figure 16:
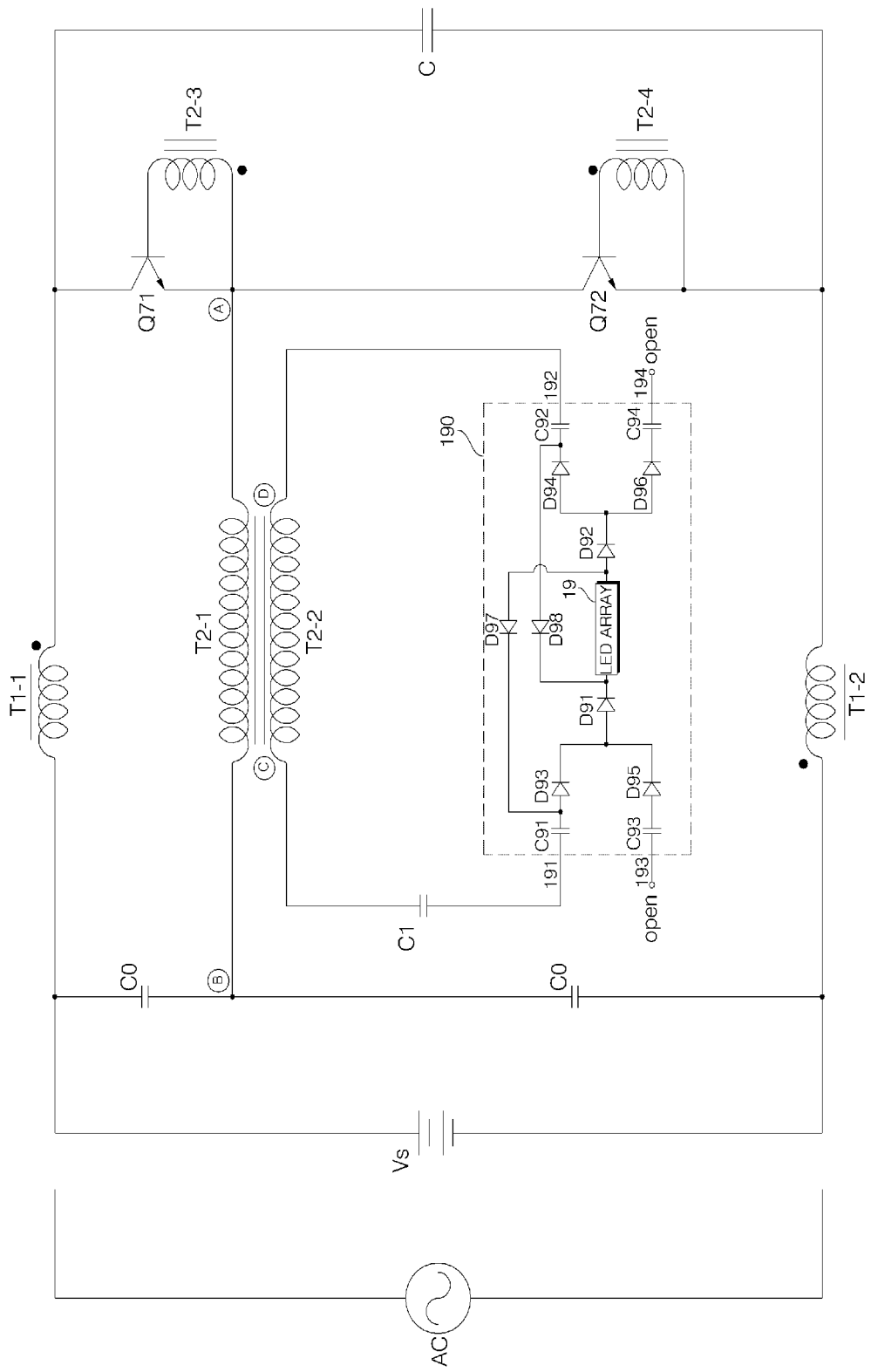
FIG. 16 illustrates a circuit diagram of an instant start-type electronic fluorescent lamp ballast to which the LED fluorescent lamp of the ninth exemplary embodiment of the present invention is applied.
Figure 17:
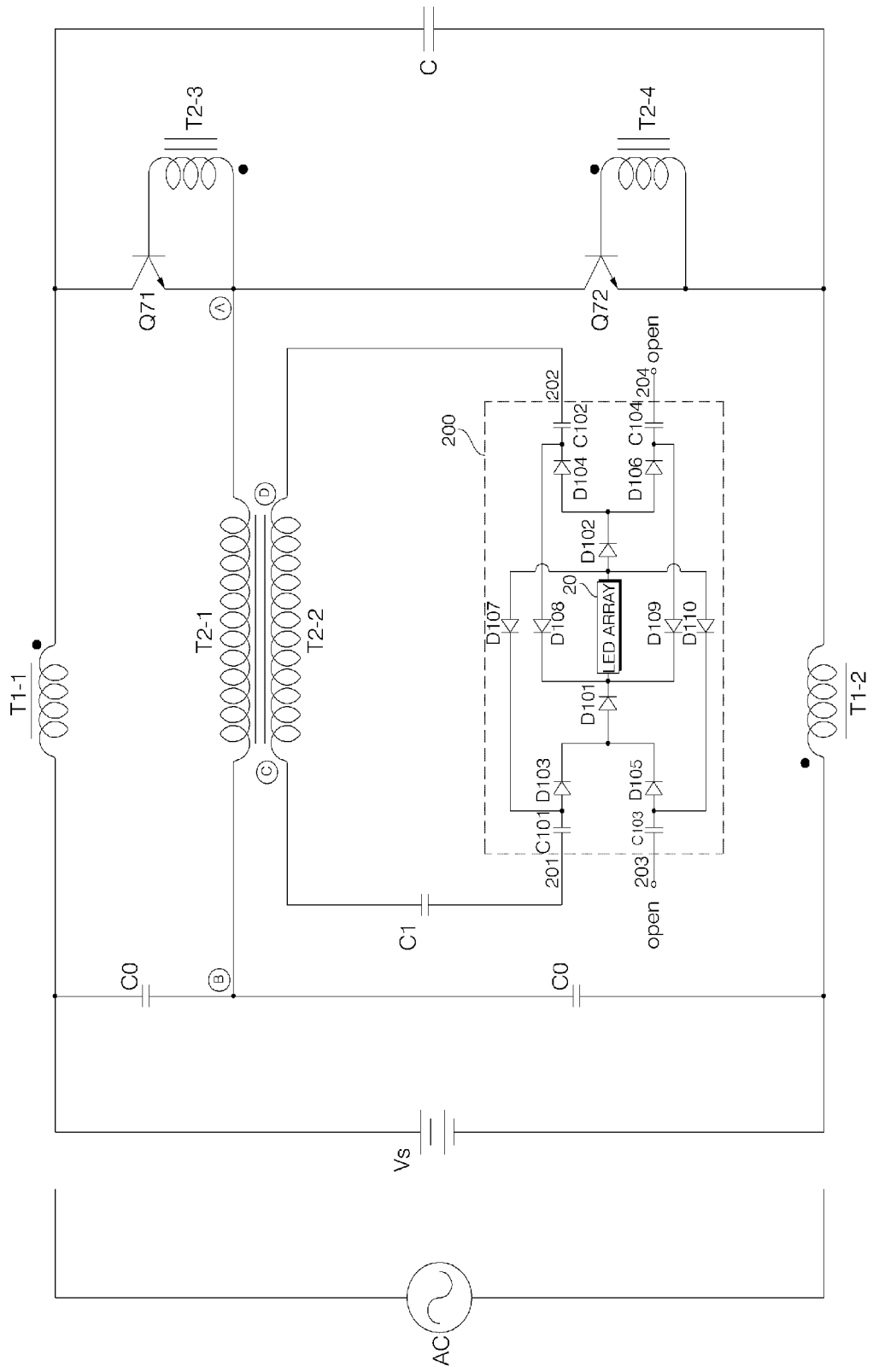
FIG. 17 illustrates a circuit diagram of an instant start-type electronic fluorescent lamp ballast to which the LED fluorescent lamp of the tenth exemplary embodiment of the present invention is applied.

FIG. 16 illustrates a circuit diagram of an instant start-type electronic fluorescent lamp ballast to which the LED fluorescent lamp 190 of the ninth exemplary embodiment of the present invention is applied, and FIG. 17 illustrates a circuit diagram of an instant start-type electronic fluorescent lamp ballast to which the LED fluorescent lamp 200 of the tenth exemplary embodiment of the present invention is applied.

Referring to FIG. 16, when the output wires of the electronic fluorescent lamp ballast are connected to the first and second connection pins 191 and 192, a transformer T2 may resonate with self-oscillation frequency and may thus induce a high AC voltage to a secondary winding T2-2. If the voltage at the node C is positive with respect to the voltage at the node D, a current may flow, sequentially passing through the node C, the capacitor C1, the capacitor C91, the diode D93, the diode D91, the LED array 19, the diode D92, the diode D94, the capacitor C92 and the node D, with a phase being shifted by $\pi/2$ by the capacitances of the capacitors C91 through C94. On the other hand, if the voltage at the node C is negative with respect to the voltage at a node D, a current may flow, sequentially passing through the node D, the capacitor C92, the diode D98, the LED array 19, the diode D97, the capacitor C91, the capacitor C1, and the node C, with a phase being shifted by $\pi/2$ by the capacitances of the capacitors C91 through C94.

Referring to FIG. 17, the third and fourth connection pins 203 and 204 may be provided in order for the LED fluorescent lamp 200 to operate symmetrically. The operation of the electronic fluorescent lamp ballast shown in FIG. 17 is almost the same as the operation of the electronic fluorescent lamp ballast shown in FIG. 16.

Figure 18:
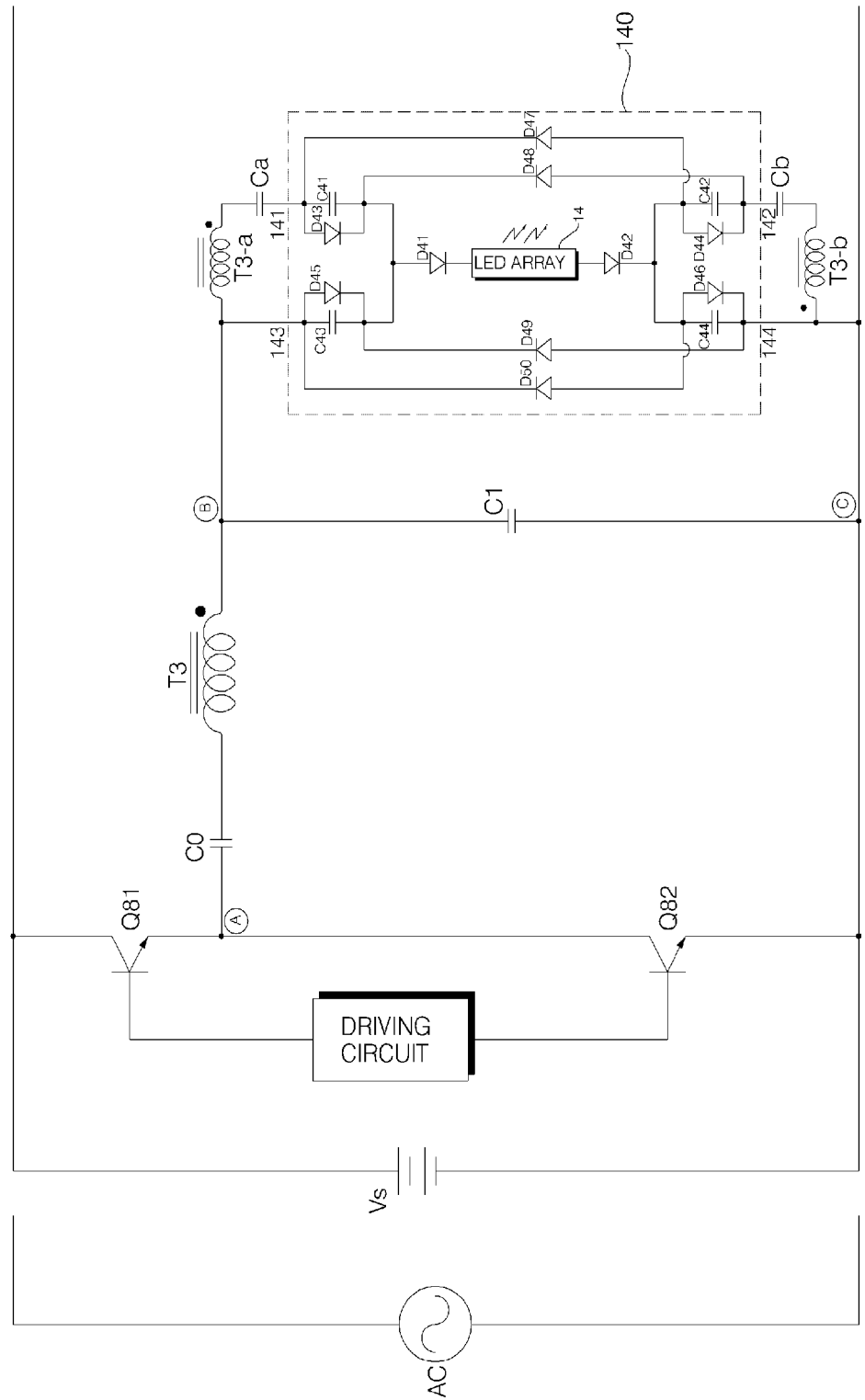
FIG. 18 illustrates a circuit diagram of a soft start-type electronic fluorescent lamp ballast to which the LED fluorescent lamp of the fourth exemplary embodiment is applied.

FIG. 18 illustrates a circuit diagram of a soft start-type electronic fluorescent lamp ballast to which the LED fluorescent lamp 140 of the fourth exemplary embodiment is applied. Referring to FIG. 18, a series resonant circuit including an inductor T3 and a capacitor C1 may be connected between switching node A, switching point of switching devices Q81 and Q82, and ground point, and the LED fluorescent lamp 140 may be connected to both ends of the capacitor C1. Originally, the secondary windings of inductor T3-a and T3-b are intended for preheating the filament of fluorescent lamp in order to maximize the lifetime of the fluorescent lamp by minimizing the dissipation of the oxide components coated on the filament of the fluorescent lamp. But when this soft start-type of electronic ballast drives the LED fluorescent lamp, these secondary windings should not influence an abnormal effect upon the normal operation of the LED fluorescent lamp 180.

If the operating frequency f of the switching devices Q81 and Q82 is synchronized with the resonant frequency which is composed of inductance L1 of the inductor T3 and the capacitance C1 and if we suppose CO>>C1, the operating frequency f may be defined by Equation (10):

$$f=1/2\pi\sqrt{L_1C_1} \quad (10).$$

A high AC voltage with the operating frequency f may be induced to both ends of the capacitor C1. Since the secondary windings T3-a and T3-b are coupled to the inductor T3, during a positive period of the AC voltage induced to T3-a, a preheating current may flow, sequentially passing through a capacitor Ca, the diode D43 and the capacitor C43. On the other hand, during a negative period of the AC voltage, a preheating current may flow, sequentially passing through the diode D45, the capacitor C41 and the capacitor Ca. Similarly during a positive period of the AC voltage induced to T3-b, a preheating current may flow, sequentially passing through the capacitor C44, the diode D44 and the capacitor Cb. On the other hand, during a negative period of the AC voltage, a preheating current may flow, sequentially passing through the capacitor Cb, the capacitor C42 and the diode D46. If we let C41=C42=C43=C44=C2, the total capacitance C that controls the preheating current flown in the secondary winding T3-a or T3-b may be defined by Equation (11):

$$C = \frac{C_a C_2}{C_a + C_2}. \quad (11)$$

Since Ca>>$C_2$ the current flown in the secondary windings T3-a or T3-b may be determined by capacitance C2, which is equal to the value of capacitor C41 through C44. Since the capacitance C2 is only as small as several thousands of picofarads and the voltage induced to the secondary windings T3-*a* or T3-*b* are only as low as several volts, the current flown through the secondary windings T3-*a* or T3-*b* may be ignored by the diodes D43 through D46.

If the resonant voltage induced at the node B is positive with respect to the voltage at the node C, a current may flow in the LED fluorescent lamp 140, sequentially passing through the node B, the diode D45, the diode D41, the LED array 14, the diode D42, and the diode D46. On the other hand, if the voltage at the node B is negative with respect to the voltage at the node C, a current may flow in the LED fluorescent lamp 140, sequentially passing through the node C, the diode D49, the diode D41, the LED array 14, the diode D42, the diode D50 and the node B.

The main current flown in the LED array 14 may be controlled by varying the number of series connected LEDs.

Figure 19:
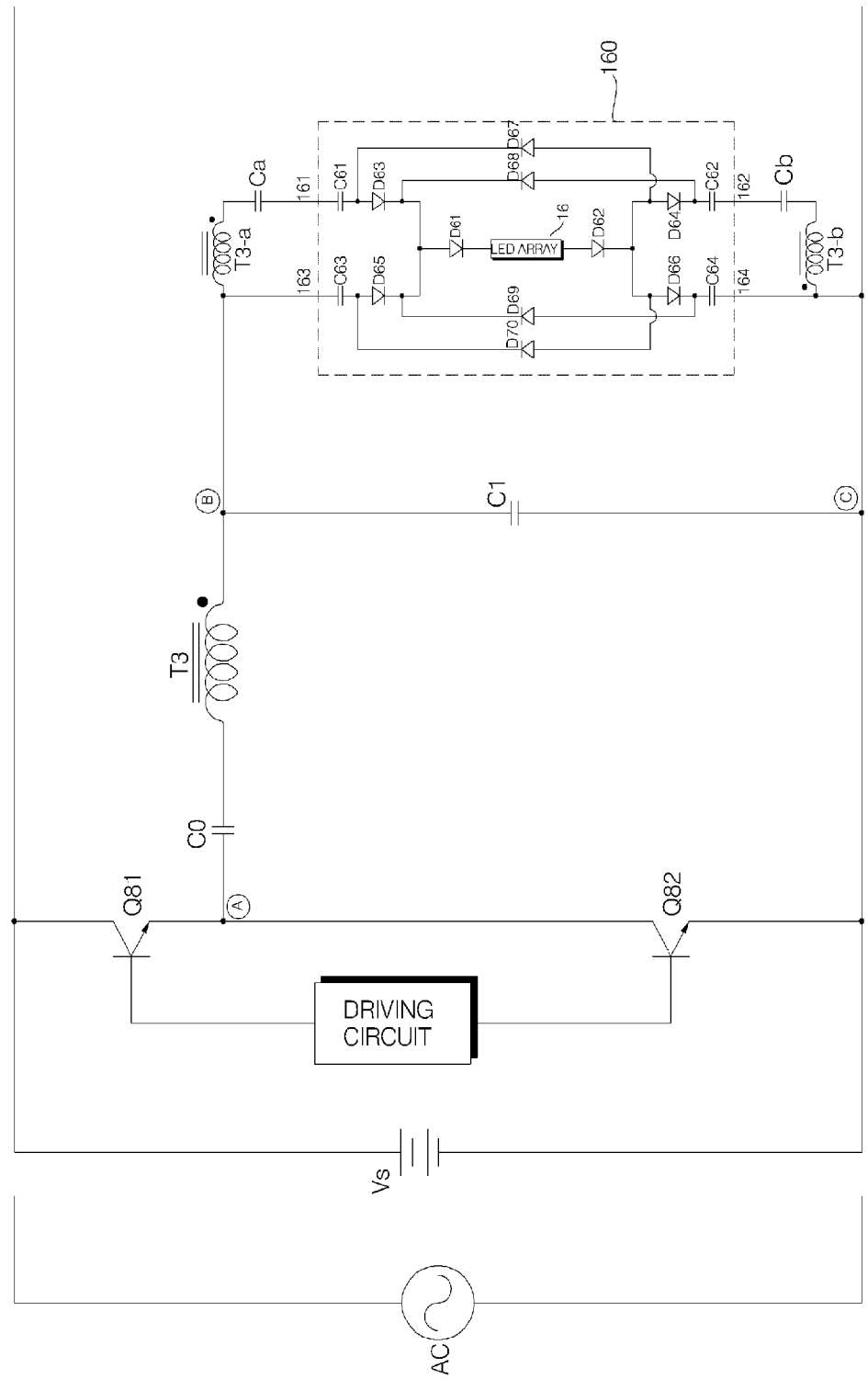
FIG. 19 illustrates a circuit diagram of a soft start-type electronic fluorescent lamp ballast to which the LED fluorescent lamp of the sixth exemplary embodiment is applied.

FIG. 19 illustrates a circuit diagram of a soft start-type electronic fluorescent lamp ballast to which the LED fluorescent lamp 160 of the sixth exemplary embodiment is applied.

Referring to FIG. 19, an operating frequency f may be the same as that described above with reference to FIG. 18, and an AC voltage with the operating frequency f may be induced to both ends of a capacitor C1. During the operation of the soft start-type electronic fluorescent lamp ballast with LED fluorescent lamp instead of conventional fluorescent lamp, since the voltage induced to a secondary winding T3-*a*, which is coupled to an inductor T3 and is designed for pre-heating the filaments of fluorescent lamp, is only as low as below 10V, the voltage at the secondary winding T3-*a* may be blocked by the diodes D63 and D65, and thus, a preheating current for fluorescent lamp filament may not be able to flow through the secondary winding T3-*a*. Likewise, the voltage at the secondary winding T3-*b* for preheating the fluorescent lamp filament may be blocked by the diodes D64 and D66, and thus, a preheating current for fluorescent lamp filament may not be able to flow through the winding T3-*b*. Therefore, power loss that may be caused by the secondary winding T3-*a* and T3-*b* may be ignored and as a result, the current for filament pre-heating generated by the secondary windings T3-*a* and T3-*b* may be ignored.

If we ignore the secondary windings T3-*a* and T3-*b*, when the voltage at the node B is positive with respect to the voltage at the node C, a current may flow, sequentially passing through the node B, the capacitor C63, the diode D65, the diode D61, the LED array 16, the diode D62, the diode D66, the capacitor C64 and the node C. On the other hand, if the voltage at the node B is negative with respect to the voltage at the node C, a current may flow, sequentially passing through the node C, the capacitor C64, the diode D69, the diode D61, the LED array 16, the diode D62, the diode D70, the capacitor C63 and the node B. Therefore, if we let C61=C62=C63=C64=C2, the composite impedance of the soft start-type electronic fluorescent lamp ballast may become $2/j\omega C2$. Thus, the main current flown in the LED array 16 may be controlled by varying the capacitance C2 of the capacitors C61 through C64.

Figure 20:
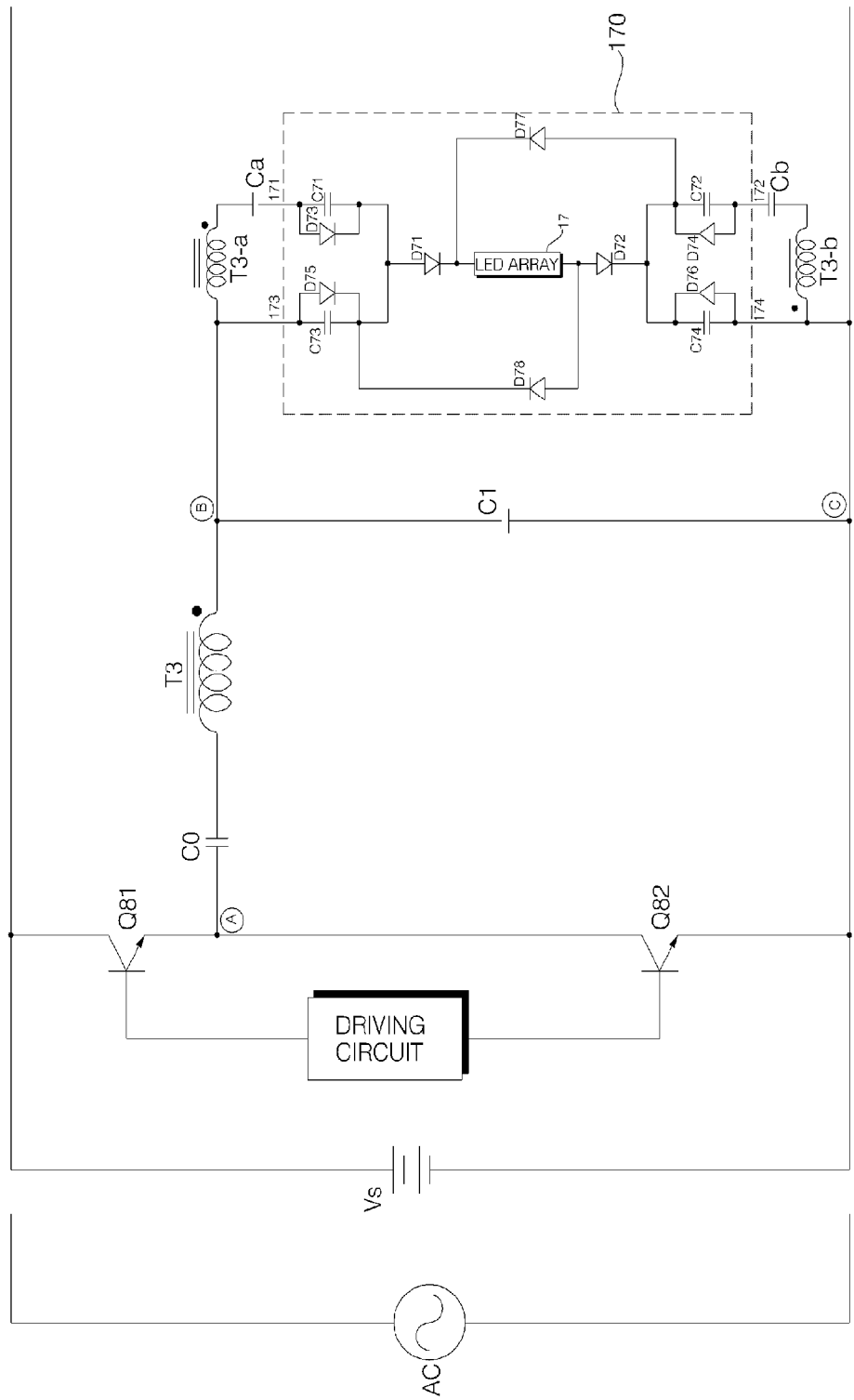
FIG. 20 illustrates a circuit diagram of a soft start-type electronic fluorescent lamp ballast to which the LED fluorescent lamp of the seventh exemplary embodiment is applied.

FIG. 20 illustrates a circuit diagram of a soft start-type electronic fluorescent lamp ballast to which the LED fluorescent lamp 170 of the seventh exemplary embodiment is applied.

The basic operation of the soft start-type electronic ballast shown in FIG. 20 is almost the same as the operation of the soft start-type electronic ballast shown in FIG. 19.

Referring to FIG. 20, a current flown into the LED array 17 by secondary windings T3-*a* and T3-*b* for pre-heating the fluorescent lamp filaments may be low enough to be ignored.

If we ignore the secondary windings T3-*a* and T3-*b*, when the voltage at the node B is positive with respect to the voltage at the node C, a current may flow, sequentially passing through the node B, the diode D75, the diode D71, the LED array 17, the diode D72, the capacitor C74 and the node C. On the other hand, if the voltage at the node B is negative with respect to the voltage at the node C, a current may flow, sequentially passing through the node C, the diode D76, the diode D77, the LED array 17, the diode D78, the capacitor C73 and the node B. Therefore, if we let C71=C72=C73=C74=C2, the total composite impedance of the soft start-type electronic fluorescent lamp ballast may become $1/j\omega C2$. Thus, the main current flown in the LED array 17 may also be controlled by varying the capacitance C2 and the total number of LEDs.

Figure 21:
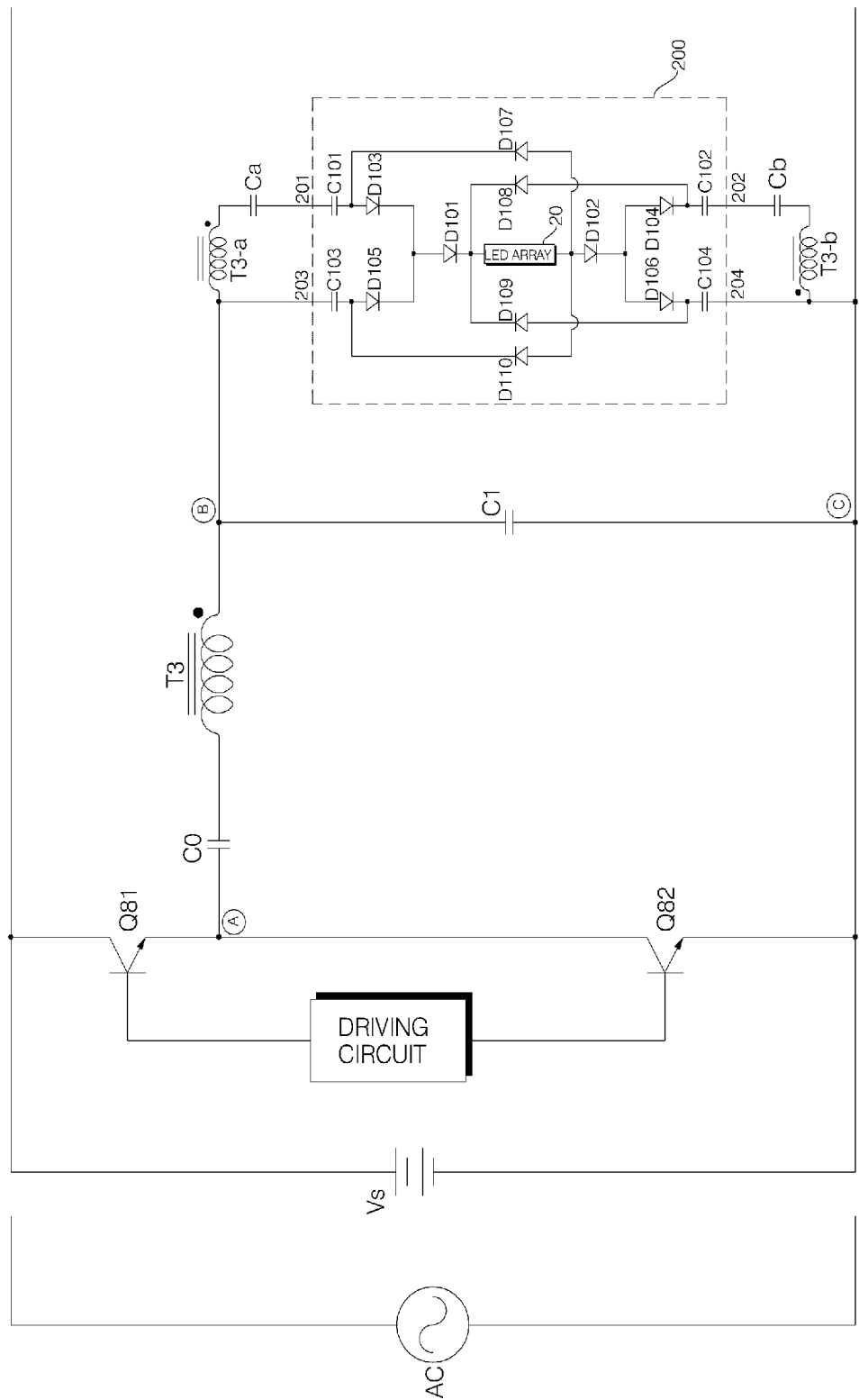
FIG. 21 illustrates a circuit diagram of a soft start-type electronic fluorescent lamp ballast to which the LED fluorescent lamp of the tenth exemplary embodiment is applied.

FIG. 21 illustrates a circuit diagram of a soft start-type electronic fluorescent lamp ballast to which the LED fluorescent lamp 200 of the tenth exemplary embodiment is applied. Referring to FIG. 21, a current flown into the LED array 20 by secondary windings T3-*a* and T3-*b* for pre-heating filaments may be low enough to be ignored. If we ignore the secondary windings T3-*a* and T3-*b*, when the voltage at the node B is positive with respect to the voltage at the node C, a current may flow, sequentially passing through the node B, the capacitor C103, the diode D105, the diode D101, the LED array 20, the diode D102, the diode D106, the capacitor C104 and the node C, with a phase being shifted by $\pi/2$ by the capacitance of the capacitors C101 through C104.

On the other hand, if the voltage at the node B is negative with respect to the voltage at the node C, a current may flow, sequentially passing through the node C, the capacitor C104, the diode D109, the LED array 20, the diode D110, the capacitor C103 and the node B, with a phase being shifted by $\pi/2$ by the capacitance of the capacitors C101 through C104. Therefore, if we let C101=C102=C103=C104=$C_2$, the total composite impedance of the soft start-type electronic fluorescent lamp ballast may become $2/j\omega C_2$ and the main current flown in the LED array 20 may be controlled by varying the capacitance $C_2$ of capacitors C101 through C104.

Figure 22:
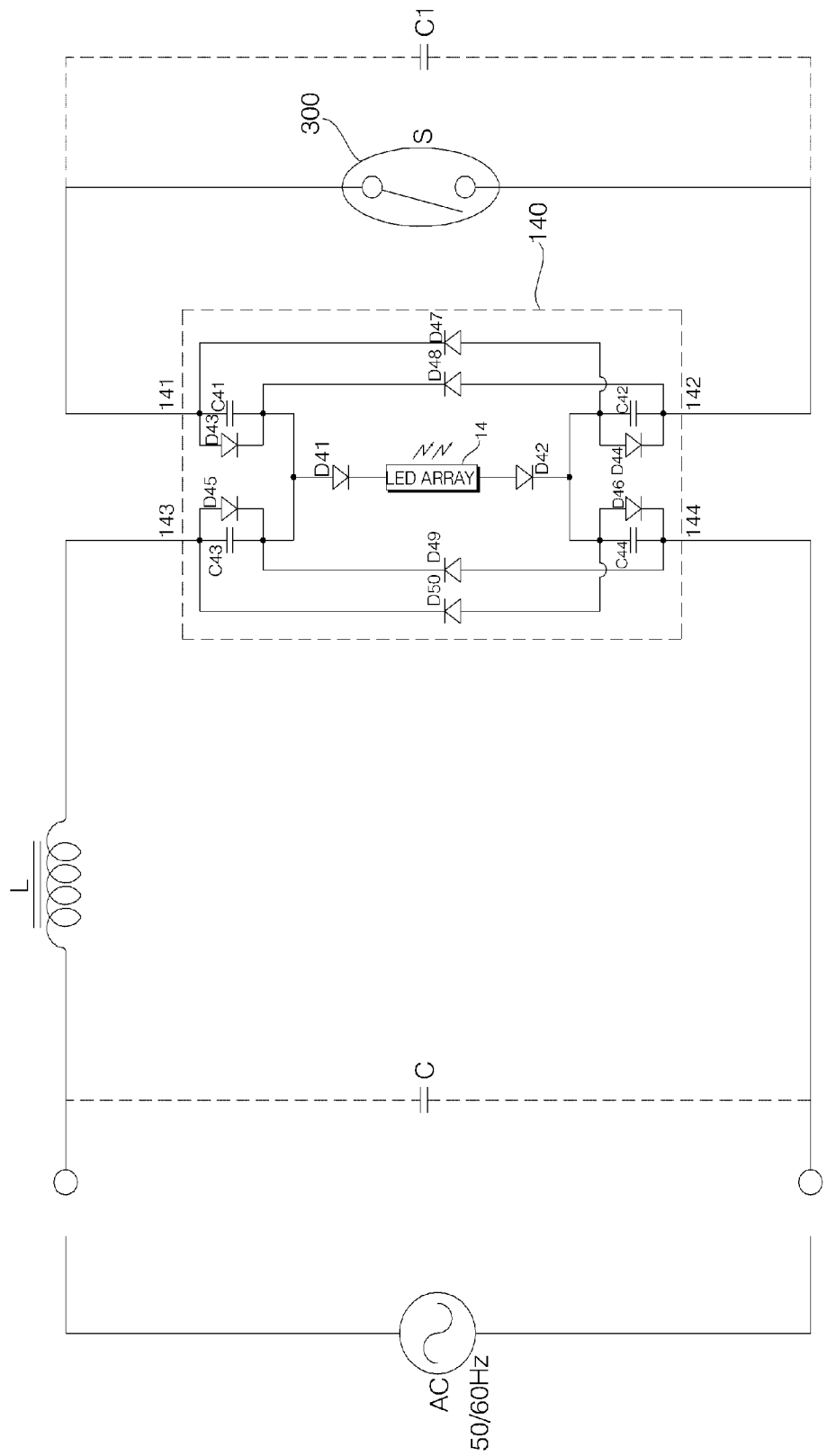
FIG. 22 illustrates a circuit diagram of a starter lamp-based magnetic fluorescent lamp ballast to which the LED fluorescent lamp of the fourth exemplary embodiment is applied.

FIG. 22 illustrates a circuit diagram of a starter lamp-based magnetic fluorescent lamp ballast to which the LED fluorescent lamp 140 of the fourth exemplary embodiment is applied. Referring to FIG. 22, when we drive the LED fluorescent lamp instead of conventional fluorescent lamp, a starter lamp (S) 300 may be considered to be open, and thus, during a positive period of an input AC voltage, a current may flow, sequentially passing through an inductor L, the diode D45, the diode D41, the LED array 14, the diode D42 and the diode D46.

In this case, the main current flown in the LED fluorescent lamp 140 may be controlled by the impedance of the inductor L, i.e., $j\omega L$ and the total number of LEDs.

On the other hand, during a negative period of the input AC input voltage, a current may flow, sequentially passing through the diode D49, the diode D41, the LED array 14, the diode D42, the diode D50 and the inductor L. In this case, the current flown in the LED fluorescent lamp 140 may be a pulsating current having twice as high a frequency (100/120 Hz) as the frequency f (50/60 Hz) of the commercial electric power source. Therefore, it is possible to considerably reduce the probability of occurrence of flickering, which may be caused by driving the LED fluorescent lamp 140 at the frequency f of the commercial electric power source.

Figure 23:
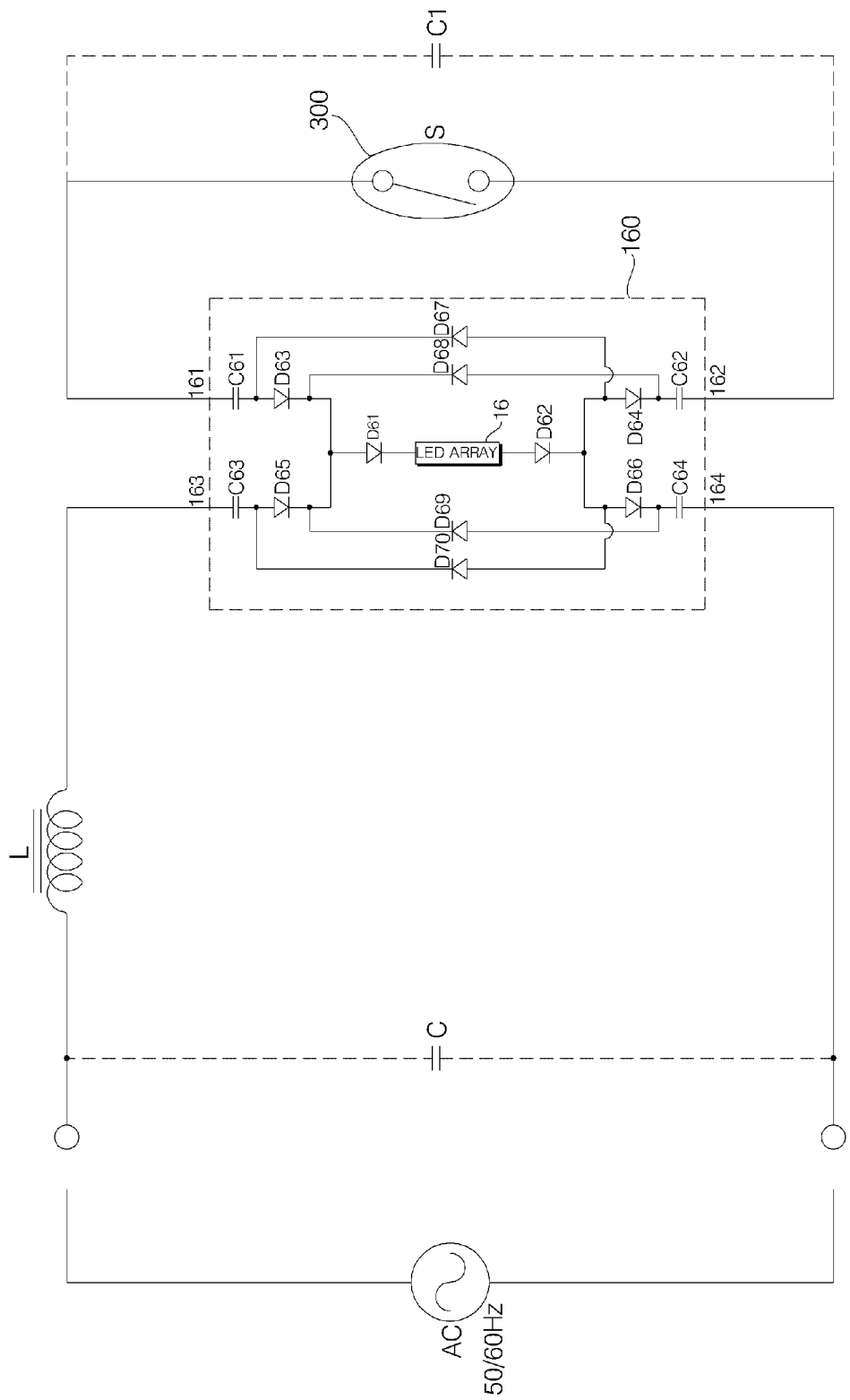
FIG. 23 illustrates a circuit diagram of a starter lamp-based magnetic fluorescent lamp ballast to which the LED fluorescent lamp of the sixth exemplary embodiment is applied.

FIG. 23 illustrates a circuit diagram of a starter lamp-based magnetic fluorescent lamp ballast to which the LED fluorescent lamp 160 of the sixth exemplary embodiment is applied. Referring to FIG. 23, when we drive the LED fluorescent lamp instead of conventional fluorescent lamp, a starter lamp (S) 300 may be considered to be open, and thus, during a positive period of an input AC input voltage, a current may flow, sequentially passing through the capacitor C63, the diode D65, the diode D61, the LED array 16, the diode D62, the diode D66, and the capacitor C64, with a phase being shifted by π/2 by the capacitance of the capacitors C61 through C64.

On the other hand, during a negative period of the input AC input voltage, a current may flow, sequentially passing through the capacitor C64, the diode D69, the diode D61, the LED array 16, the diode D62, the diode D70, and the capacitor C63 with a phase being shifted by π/2 by the capacitance of the capacitors C61 through C64.

If we let C61=C62=C63=C64=C2, total composite impedance Z that controls the main current flown in the LED fluorescent lamp 160 may be defined by Equation (12):

$$Z = j\omega L - j\frac{2}{\omega C_2} \quad (12)$$

where L indicates the inductance of an inductor L.

The current flown in the LED fluorescent lamp 160 may be a pulsating current having twice as high a frequency (100/120 Hz) as the frequency f (50/60 Hz) of the commercial electric power source. Therefore, it is possible to considerably reduce the probability of occurrence of flickering, which may be caused by driving the LED fluorescent lamp 140 at the frequency f.

Figure 24:
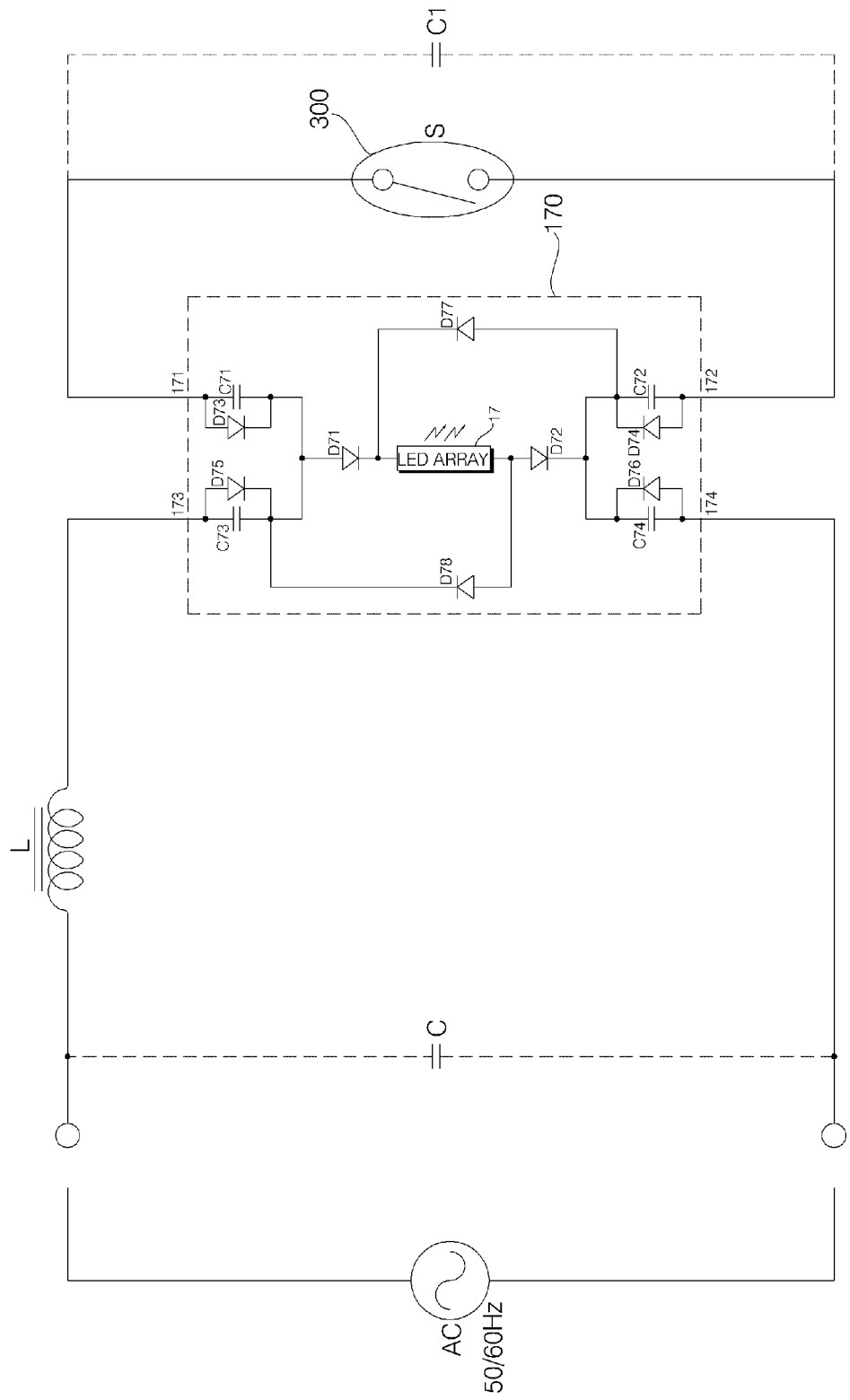
FIG. 24 illustrates a circuit diagram of a starter lamp-based magnetic fluorescent lamp ballast to which the LED fluorescent lamp of the seventh exemplary embodiment is applied.

FIG. 24 illustrates a circuit diagram of a starter lamp-based magnetic fluorescent lamp ballast to which the LED fluorescent lamp 170 of the seventh exemplary embodiment is applied. Referring to FIG. 24, during a positive period of an input AC input voltage, a current may flow, sequentially passing through the diode D75, the diode D71, the LED array 17, the diode D72 and the capacitor C74. On the other hand, during a negative period of the input AC input voltage, a current may flow, sequentially passing through the diode D76, the diode D77, the LED array 17, the diode D78 and the capacitor C73.

If we let C71=C72=C73=C74=C2, total composite impedance Z that controls the main current flown in the LED fluorescent lamp 170 may be defined by Equation (13):

$$Z = j\omega L - j\frac{1}{\omega C_2} \quad (13)$$

where L indicates the inductance of an inductor.

Figure 25:
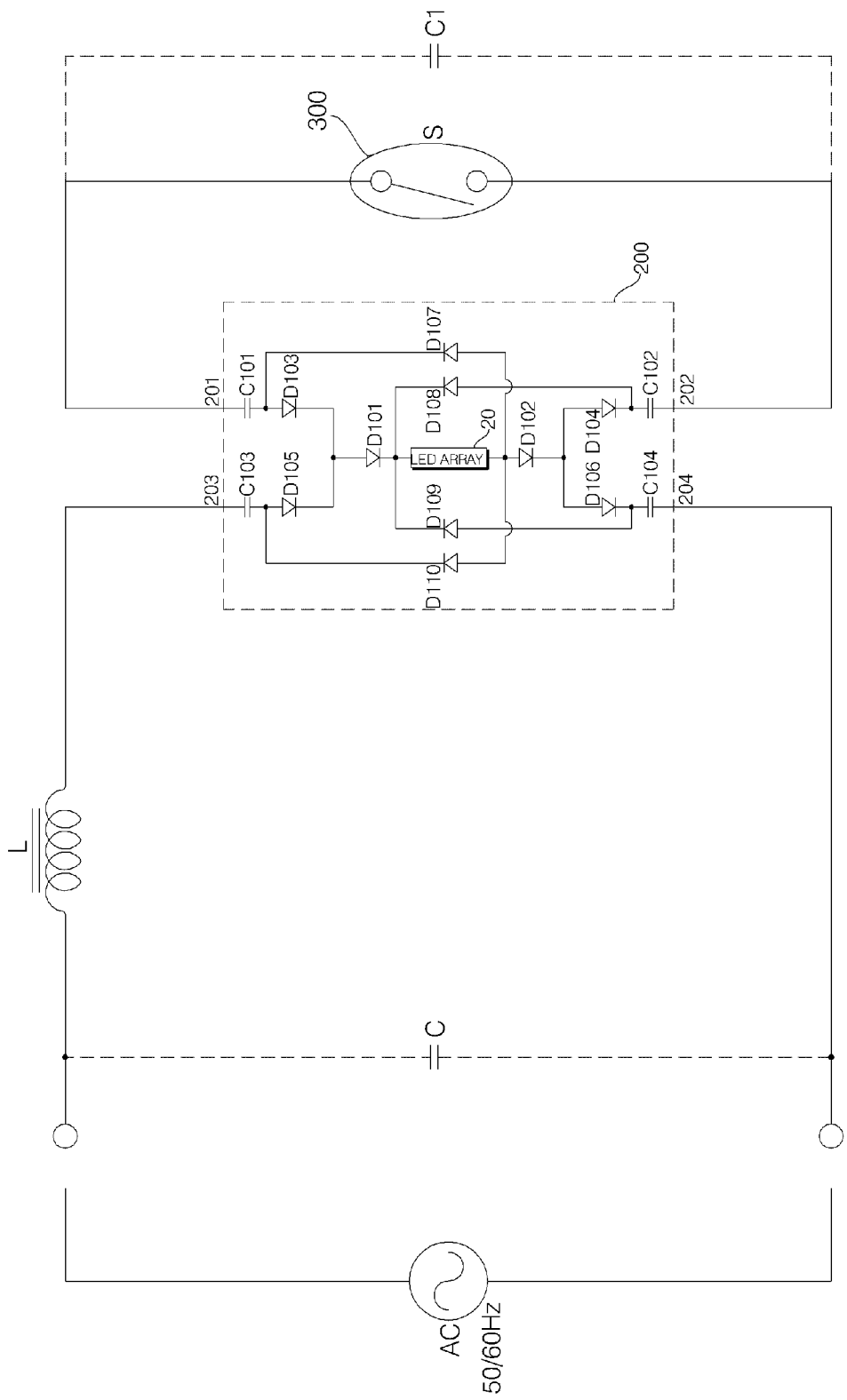
FIG. 25 illustrates a circuit diagram of a starter lamp-based magnetic fluorescent lamp ballast to which the LED fluorescent lamp of the tenth exemplary embodiment is applied.

FIG. 25 illustrates a circuit diagram of a starter lamp-type magnetic fluorescent lamp ballast to which the LED fluorescent lamp 200 of the tenth exemplary embodiment is applied. Referring to FIG. 25, when we drive the LED fluorescent lamp instead of conventional fluorescent lamp, a starter lamp (S) 300 may be considered to be open and thus during a positive period of the input AC input voltage, a current may flow, sequentially passing through the capacitor C103, the diode D105, the diode D101, the LED array 20, the diode D102, the diode D106, and the capacitor C104, with a phase being shifted by π/2 by the capacitance of the capacitors C101 through C104.

On the other hand, during a negative period of the AC input voltage, a current may flow, sequentially passing through the capacitor C104, the diode D109, the LED array 20, the diode D110, the capacitor C103, with a phase being shifted by π/2 by the capacitance of the capacitors C101 through C104. If we let C101=C102=C103=C104=C2, total composite impedance Z that controls the main current flown in the LED fluorescent lamp 200 may also be defined by equation (12).

Figure 26:
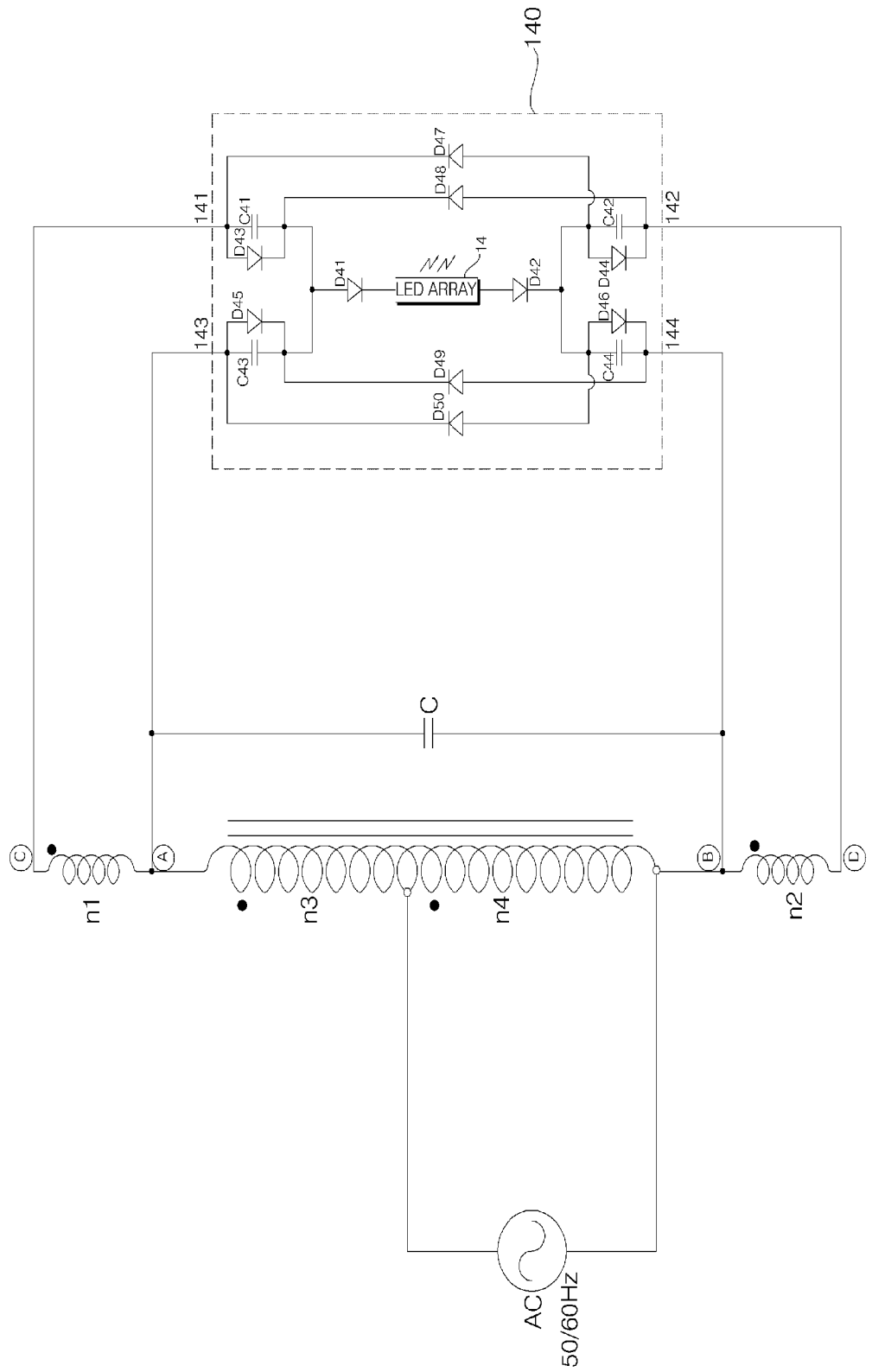
FIG. 26 illustrates a circuit diagram of a rapid start-type magnetic fluorescent lamp ballast to which the LED fluorescent lamp of the fourth exemplary embodiment is applied.

FIG. 26 illustrates a circuit diagram of a magnetic rapid start-type fluorescent lamp ballast to which the LED fluorescent lamp 140 of the fourth exemplary embodiment is applied. Referring to FIG. 26, if we define the voltages for preheating the filaments of fluorescent lamp induced to the secondary windings n1 and n2 as $V_{n1}$ and $V_{n2}$, respectively, during a positive period of the voltage $V_{n1}$, that is, when the voltage applied to the node C is positive with respect to the node A, the capacitor C41 may be short-circuited by the diode D43, and thus, the load of the secondary winding n1 may become equal to the capacitance of the capacitor C42, and during a negative period of the voltage $V_{n1}$, the capacitor C43 may be short-circuited by the diode D45, and thus, the load of the secondary winding n1 may become equal to the capacitance of the capacitor C41.

Likewise, during a positive period of the voltage $V_{n2}$, that is, when the voltage applied to the node B is positive with respect to the node D, the load of the winding n2 may become equal to the capacitance of the capacitor C44, and during a negative period of the voltage $V_{n2}$, that is, when the voltage applied to the node D is positive with respect to node B, the load of the winding n2 may become equal to the capacitance of the capacitor C42.

To keep the symmetric characteristics of fluorescent lamp, the first through fourth connection pins 141 through 144 of the LED fluorescent lamp 140 should not have any polarity.

For this purpose, the capacitors C41 through C44 should be designed to have the same capacitance value. If we let this value as C2, since the capacitance C2 is only as low as several thousands of pico-farads, the composite impedance, i.e., 1/jωC2 may become very high at the frequency of 50-60 Hz. Therefore, the preheating current of the secondary windings n1 and n2 may be ignored.

An output voltage Vo applied to node A and node B may be defined by Equation (14):

$$Vo = \frac{n3 + n4}{n4}Vi \quad (14)$$

where Vi indicates the input voltage from the commercial electric power source.

When the voltage at the node A is positive with respect to the voltage at the node B, a current may flow in the LED fluorescent lamp 140, sequentially passing through the node C, the diode D43, the diode D41, the LED array 14, the diode D42, the diode D44 and the node D. On the other hand, if the voltage at the node C is negative with respect to the voltage at the node D, a current may flow in the LED fluorescent lamp 140, sequentially passing through the node D, the diode D48, the diode D41, the LED array 14, the diode D42, the diode D47 and the node C. The main current flown in the LED array 14 may be controlled by the impedance of the leakage inductance of the ballast jωL1 and the total number of series connected LEDs.

In case of magnetic rapid start-type fluorescent lamp ballast, like in the starter lamp-based magnetic fluorescent lamp ballast shown in FIG. 25, the main current flown in the LED fluorescent lamp 140 may be a pulsating current having twice as high a frequency (100/120 Hz) as the frequency f (50/60 Hz) of the commercial electric power source. Therefore, it is possible to considerably reduce the probability of occurrence of flickering, which may be caused by driving the LED fluorescent lamp 140 at the frequency f of commercial electric power source.

Figure 27:
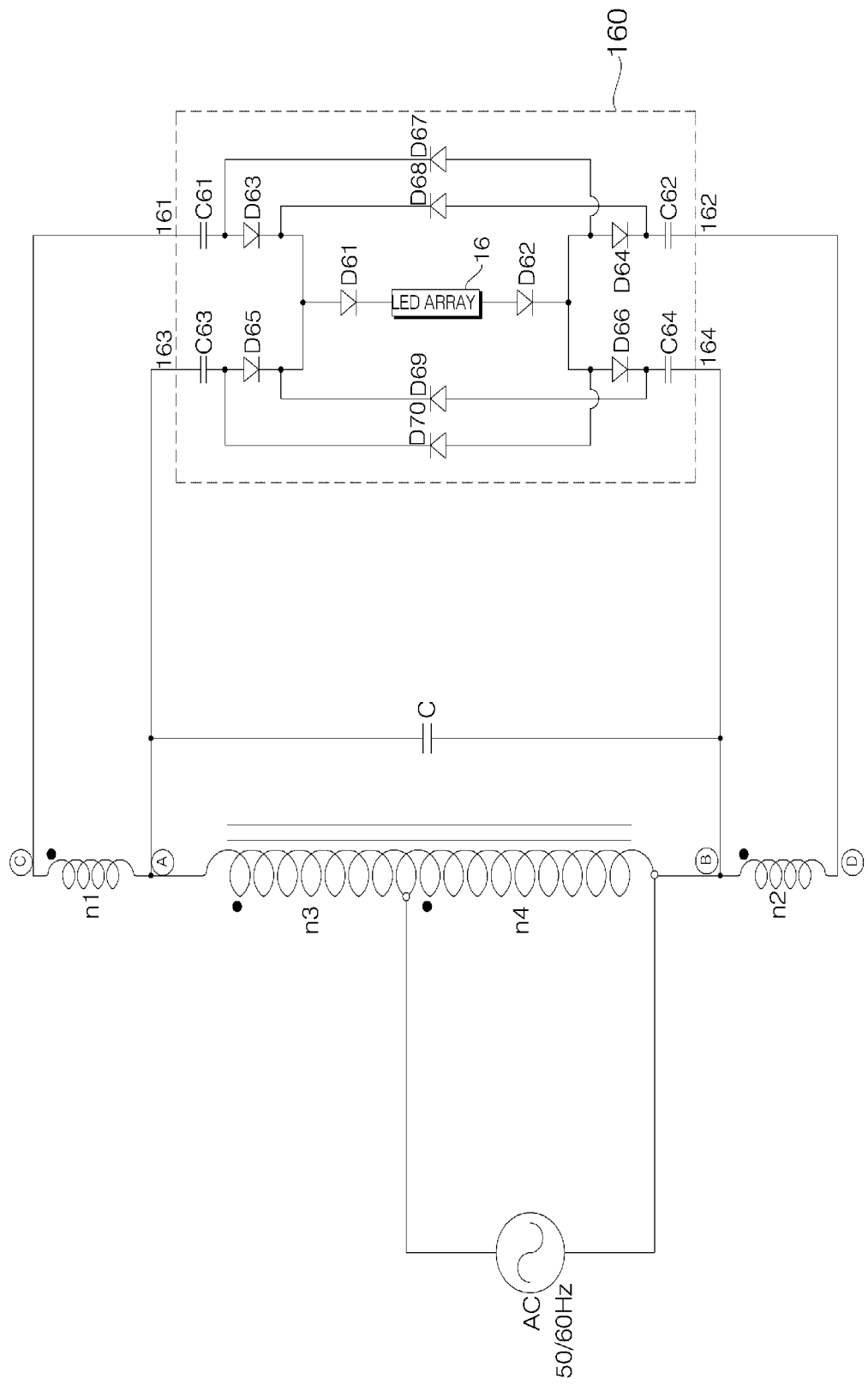
FIG. 27 illustrates a circuit diagram of a rapid start-type magnetic fluorescent lamp ballast to which the LED fluorescent lamp of the sixth exemplary embodiment is applied.

FIG. 27 illustrates a circuit diagram of a magnetic rapid start-type fluorescent lamp ballast to which the LED fluorescent lamp 160 of the sixth exemplary embodiment is applied. Referring to FIG. 27, if the voltage at the node A is positive with respect to the voltage at the node B, a current may flow, sequentially passing through the node C, the capacitor C61, the diode D63, the diode D61, the LED array 16, the diode D62, the diode D64, the capacitor C62, and the node D, with a phase being shifted by π/2 by the capacitance of the capacitors C61 through C64.

On the other hand, if the voltage at the node A is negative with respect to the voltage at the node B, a current may flow, sequentially passing through the node D, the capacitor C62, the diode D68, the diode D61, the LED array 16, the diode D62, the diode D67, the capacitor C61, and the node C, with a phase being shifted by π/2 by the capacitance of the capacitors C61 through C64.

If we let C61=C62=C63=C64=C2, total composite impedance Z that controls the main current flown in the LED fluorescent lamp 160 may be defined by Equation (15):

$$Z = j\omega L_1 - j\frac{2}{\omega C_2} \quad (15)$$

where L1 indicates leakage inductance of the ballast.

Figure 28:
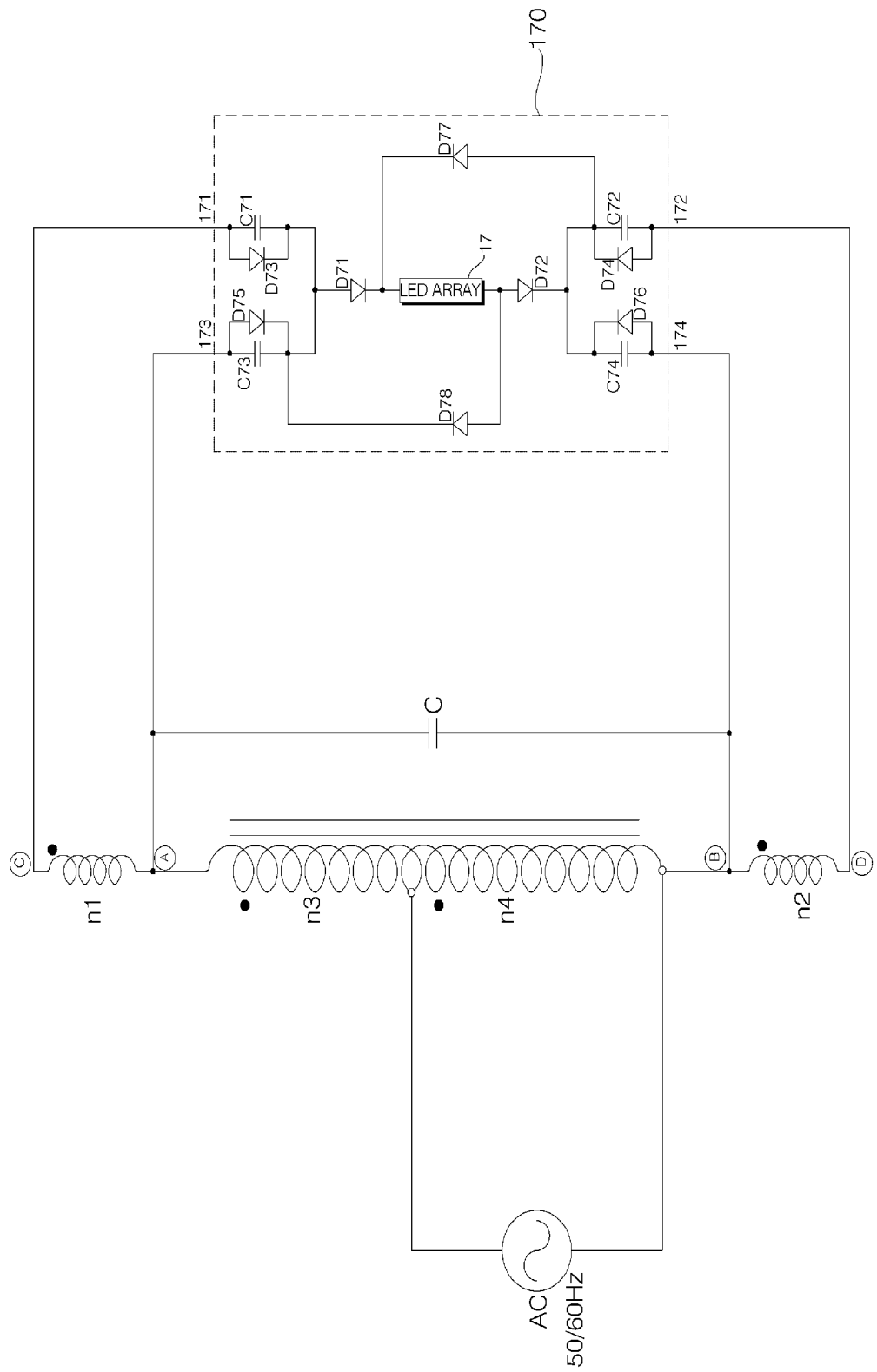
FIG. 28 illustrates a circuit diagram of a rapid start-type magnetic fluorescent lamp ballast to which the LED fluorescent lamp of the seventh exemplary embodiment is applied.

FIG. 28 illustrates a circuit diagram of a magnetic rapid start-type fluorescent lamp ballast to which the LED fluorescent lamp 170 of the seventh exemplary embodiment is applied. Referring to FIG. 28, if the voltage at the node A is positive with respect to the voltage at the node B, a current may flow, sequentially passing through the node C, the diode D73, the diode D71, the LED array 17, the diode D72, the capacitor C72, and the node D. On the other hand, if the voltage at the node A is negative with respect to the voltage at the node B, a current may flow, sequentially passing through the node D, the diode D74, the diode D77, the LED array 17, the diode D78, the capacitor C71, and the node C.

If we let C71=C72=C73=C74=C2, total composite impedance Z that controls the main current flown in the LED fluorescent lamp 170 may be defined by Equation (16):

$$Z = j\omega L_1 - j\frac{1}{\omega C_2} \quad (16)$$

where L1 indicates leakage inductance of the ballast.

In this case, the current flown through the LED fluorescent lamp 170 may be a pulsating current having twice as high a frequency (100/120 Hz) as the frequency f (50/60 Hz) of the commercial electric power source.

Figure 29:
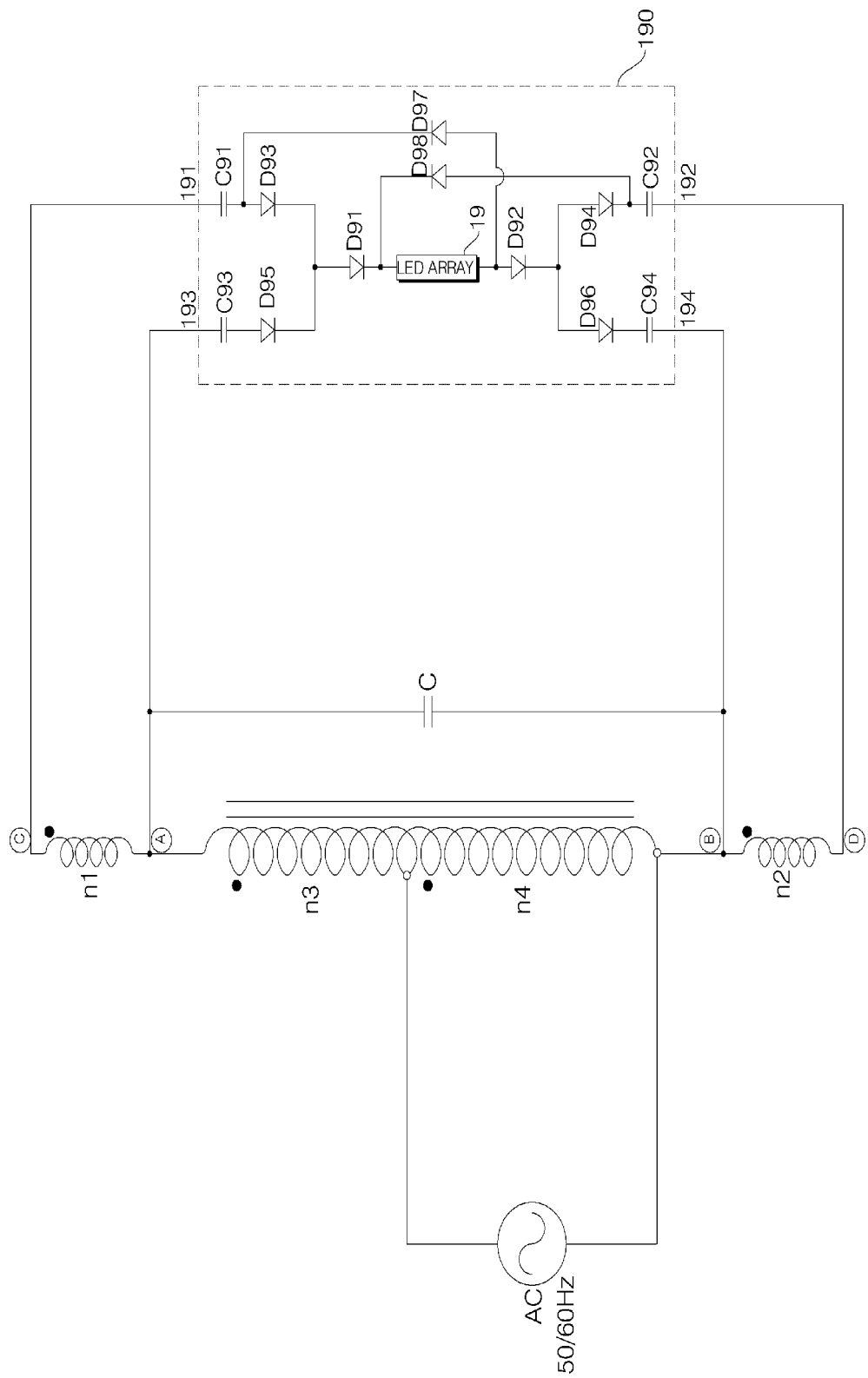
FIG. 29 illustrates a circuit diagram of an iron-core rapid start-type fluorescent lamp ballast to which the LED fluorescent lamp of the ninth exemplary embodiment is applied.
Figure 30:
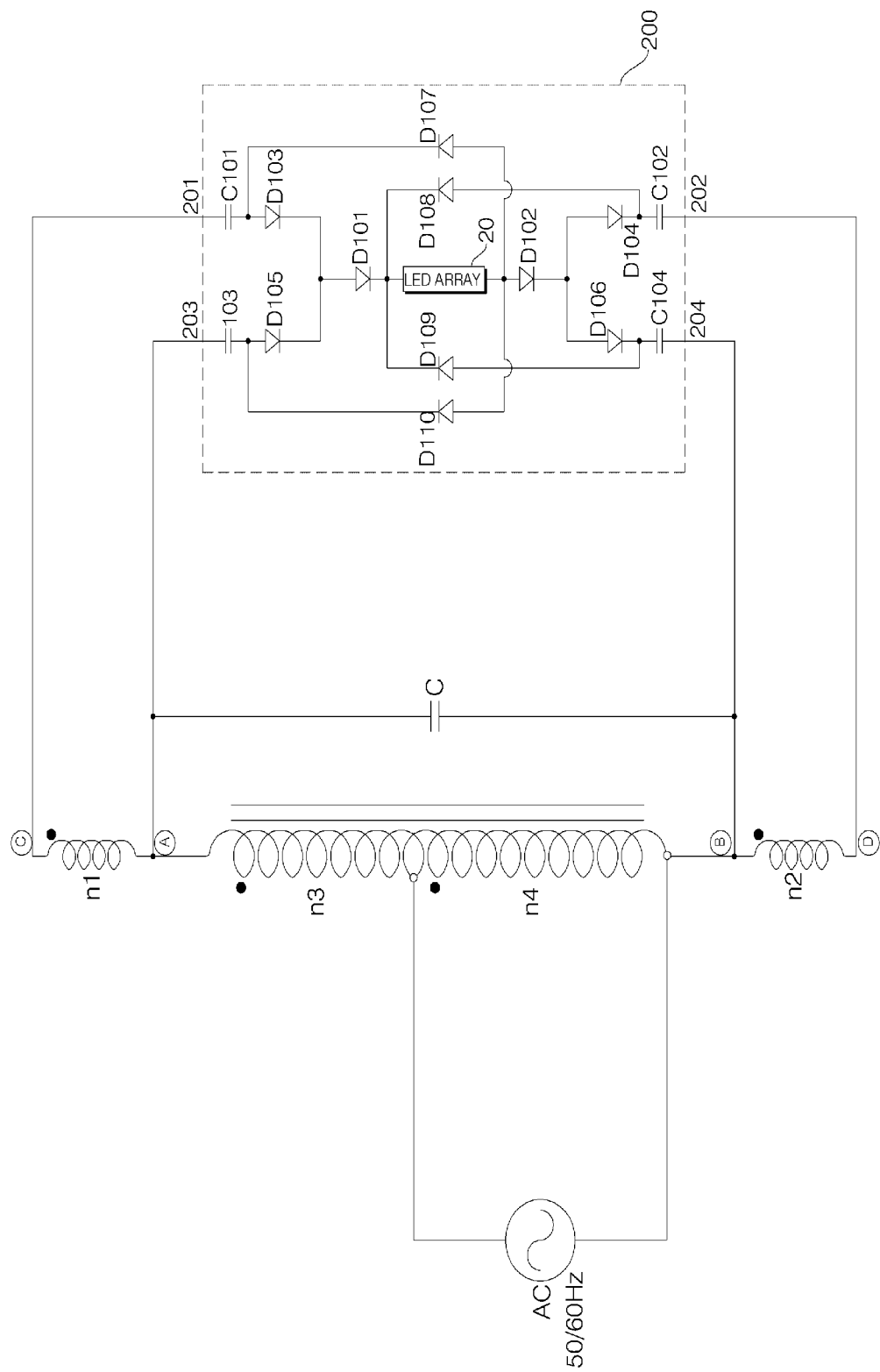
FIG. 30 illustrates a circuit diagram of an iron-core rapid start type fluorescent lamp ballast to which the LED fluorescent lamp of the tenth exemplary embodiment is applied.

FIG. 29 illustrates a circuit diagram of an iron core rapid start-type fluorescent lamp ballast to which the LED fluorescent lamp 190 of the ninth exemplary embodiment is applied, and FIG. 30 illustrates a circuit diagram of an iron core rapid start-type fluorescent lamp ballast to which the LED fluorescent lamp 200 of the tenth exemplary embodiment is applied.

Referring to FIG. 29, if the voltage at the node A is positive with respect to the voltage at the node B, a current may flow, sequentially passing through the node C, the capacitor C91, the diode D93, the diode D91, the LED array 19, the diode D92, the diode D94, the capacitor C92, and the node D, with a phase being shifted by π/2 by the capacitance of the capacitors C91 through C94.

On the other hand, if the voltage at the node A is negative with respect to the voltage at the node B, a current may flow, sequentially passing through the node D, the capacitor C92, the diode D98, the LED array 19, the diode D97, the capacitor C91 and the node C, with a phase being shifted by π/2 by the capacitance of the capacitors C91 through C94.

The operation of the magnetic rapid start-type fluorescent lamp ballast shown in FIG. 30 is almost the same as the operation of the magnetic rapid start-type fluorescent lamp ballast shown in FIG. 29 except that two diodes D109 and D110 are added to keep the symmetric characteristics of LED fluorescent lamp 200.

Generally, the instant start-type electronic fluorescent lamp ballast applies an initial voltage to a lamp that is many times greater than the lamps normal operating voltage. Thus, if there are loose contact between in the external connection pins and sockets, the sockets of the LED lamp or components of the LED lamp may be burned out by the spike voltage from the ballast. So, circuit breakers, e.g., fuses, fusible resistor or delay, can be connected in main current circuits of the LED fluorescent lamp to protect the circuit from the surge voltage in this embodiment. Hereinafter, such exemplary embodiments will be described.

Figure 31:
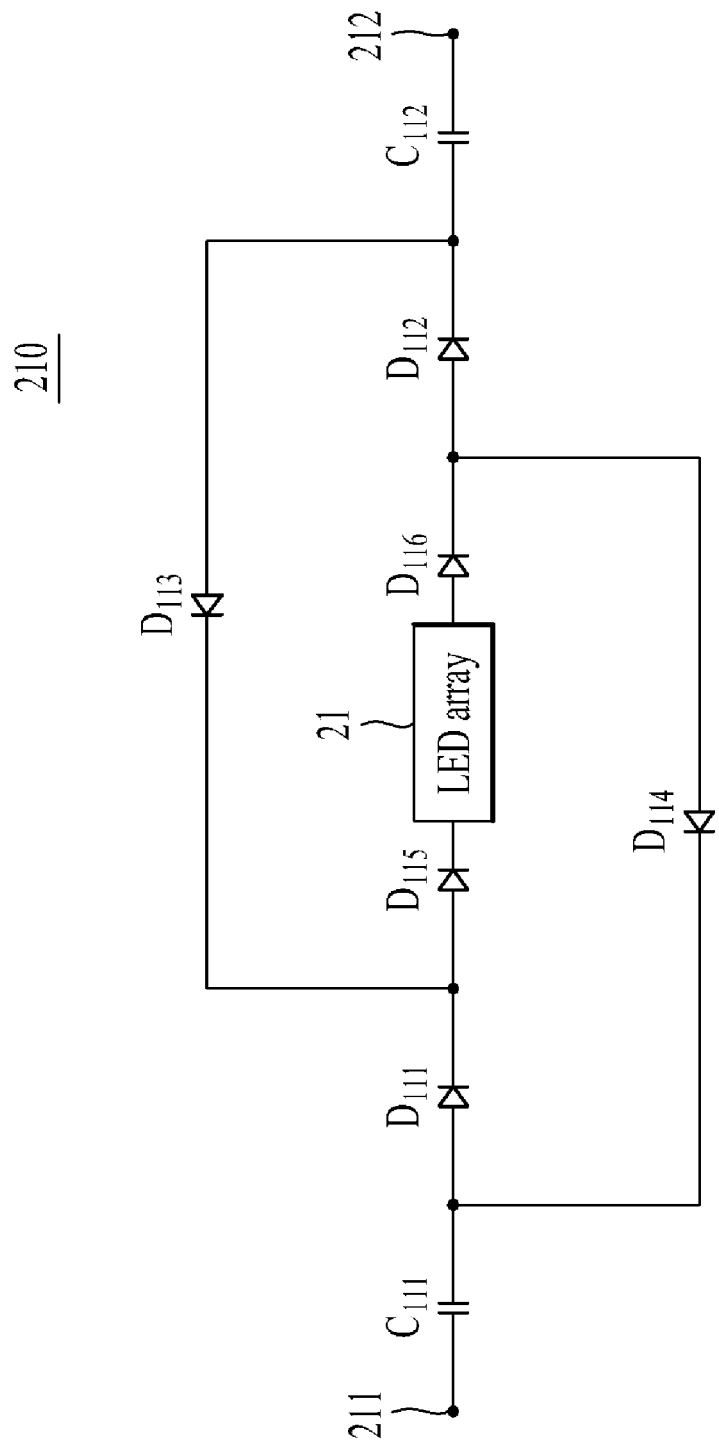
FIG. 31 illustrates a circuit diagram of an LED fluorescent lamp according to an eleventh exemplary embodiment of the present invention.

FIG. 31 illustrates a circuit diagram of an LED lamp 210 according to an eleventh exemplary embodiment of the present invention.

Referring to FIG. 31, the LED lamp 210 may include two external connection pins 211 and 212, an LED array 21, a plurality of capacitors C111 and C112, a plurality of diodes D111 through D116. In detail, the LED lamp 210 includes a serial circuit of an external connection pin 211, a capacitor C111, a diode D111, a diode D115, an LED array 21, a diode D116, a diode D112, a capacitor C112 and an external connection pin 212. Also, the LED lamp 210 includes a diode D113 which is connected in anti-parallel with a series circuit of the diode D115, the LED array 21, the diode D116 and the diode D112. Further, the LED lamp 210 includes a diode D114 which is connected in anti-parallel with a series circuit of the diode D111, the diode D115, the LED array 21 and the diode D116.

Thus, for example, if a positive voltage (+) is applied to the connection pin 211, the current flows through the series circuit of the external connection pin 211, the capacitor C111, the diode D111, the diode D115, the LED array 21, the diode D116, the diode D112, the capacitor C112 and the external connection pin 212, whereby the LED array 21 works. Also, if a positive voltage (+) is applied to the connection pin 212, the current flows through a circuit of the external connection pin 212, the capacitor C112, the diode D113, the diode D115, the LED array 21, the diode D116, the diode D114, the capacitor C111 and the external connection pin 211, whereby the LED array 21 works.

Therefore, the LED lamp 210 of this embodiment can be applied even to the conventional fluorescent ballast which supplies an AC voltage, because the LED array 210 works regardless of the direction of the input voltage.

While the LED lamp 210 includes the diodes D111 through D116 in this embodiment, it can be modified and have various types of circuit. For instance, either the diodes D111 and D112 or the diodes D111 through D114 can be omitted from the LED lamp 210.

Figure 32:
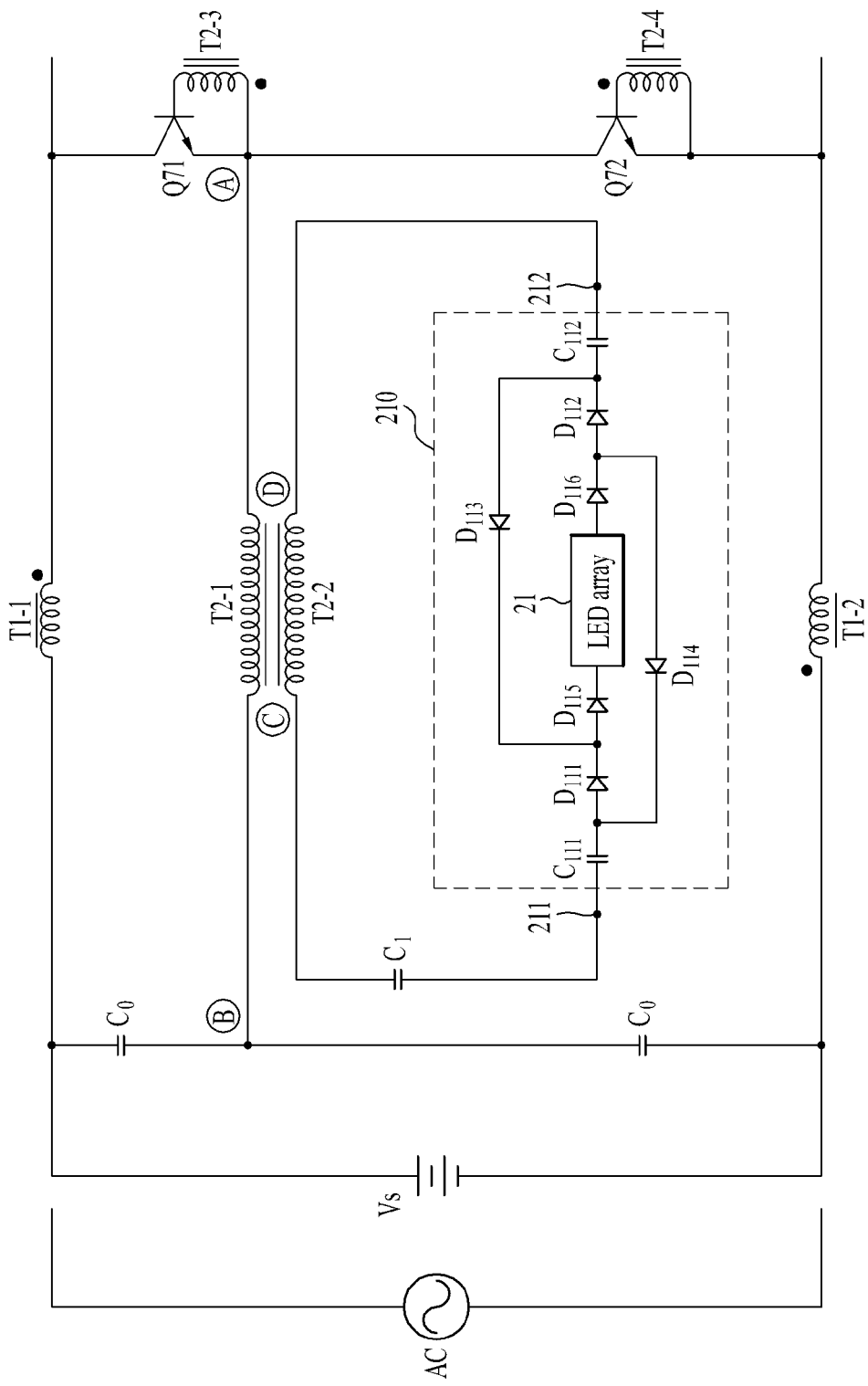
FIG. 32 illustrates a circuit diagram of a rapid start-type fluorescent lamp ballast to which the LED fluorescent lamp of the seventh exemplary embodiment is applied.

FIG. 32 illustrates a circuit diagram of an instant start-type fluorescent lamp ballast with which the LED lamp 210 of the eleventh exemplary embodiment is coupled. Referring to FIG. 32, switching devices Q71 and Q72 continuously perform a switching operation, due to a self-oscillation operation of a circuit formed by transformers T1 and T2 and a capacitor. Here, a primary winding T2-1 of the transformer T2 can be connected between an output terminal of the switching device Q71 (i.e., a switching node A) and a neutral point of the capacitors Co (i.e., a switching node B). The instant start-type of fluorescent lamp ballast may initially discharge the lamp by using a high voltage induced in a secondary winding T2-2 of the transformer T2. Once the lamp is discharged, the instant start-type of ballast may control stabilization current by using a capacitor C1 which is connected in series to a lamp load.

The operation of the LED lamp 210 coupled with the instant start-type of ballast will be described in further detail. The transformer T2 induces a high AC voltage in the secondary winding T2-2 by the self-oscillation. And then, if the voltage of the node C is higher than the voltage of the node D, the current sequentially passes through the node C—the capacitor C1—the capacitor C111—the diode D111—the diode D115—the LED array 21—the diode D116—the diode D112—the capacitor C112—the node D. On the other hand, if the voltage of the node C is lower than the voltage of the node D, the current sequentially passes through the node D—the capacitor C112—the diode D113—the diode D115—the LED array 21—the diode D116—the diode D114—the capacitor C111—the node C.

Therefore, the current flowing through the LED array 21 can be controlled by the value of a complex impedance of the capacitors C1, C111 and C112, that is, it can be controlled by changing the capacitance of the capacitors C111 and C112 which are inside the LED array 21.

As described above, the LED lamp according to the present invention can be readily installed and used with various types of fluorescent lamp ballasts without the requirement of the installation of an additional fluorescent lamp ballasts or the change of internal wiring of the fixture. Therefore, the LED fluorescent lamp according to the present invention can replace an existing fluorescent lamp very efficiently at low cost.

While the present invention has been described with reference to exemplary embodiments thereof, it will be understood by those of ordinary skill in the art that various changes in form and details may be made therein without departing from the spirit and scope of the present invention as defined by the following claims.

What is claimed is:

1. An LED lamp comprising:
a first external connection pin connected to a first terminal of an electronic or magnetic fluorescent lamp ballast;
a second external connection pin connected to a second terminal of the electronic or magnetic fluorescent lamp ballast;
an LED array disposed between the first external connection pin and the second external connection pin;
a first capacitor having a first end connected to the first external connection pin;
a first diode having an anode connected to a second end of the first capacitor and a cathode connected to an anode terminal of the LED array;
a second capacitor having a first end connected to the second external connection pin; and
a second diode having an cathode connected to a second end of the second capacitor and an anode connected to a cathode terminal of the LED array.

2. The LED lamp of claim 1, further comprising:
a third diode having an anode connected to the cathode of the second diode and a cathode connected to the cathode of the first diode; and
a fourth diode having an anode connected to the anode of the second diode and a cathode connected to the anode of the first diode.

3. The LED lamp of claim 2, further comprising:
a fifth diode intervening between the first diode and the LED array, the fifth diode having an anode connected to the cathode of the first diode and the cathode of the third diode and having a cathode connected to the anode terminal of the LED array; and
a sixth diode intervening between the second diode and the LED array, the sixth diode having an cathode connected to the anode of the second diode and the anode of the fourth diode and having a anode connected to the cathode terminal of the LED array.

4. The LED lamp of claim 1, further comprising:
a fifth diode intervening between the first diode and the LED array, the fifth diode having an anode connected to the cathode of the first diode and a cathode connected to the anode terminal of the LED array; and
a sixth diode intervening between the second diode and the LED array, the sixth diode having an cathode connected to the anode of the second diode and a anode connected to the cathode terminal of the LED array.

* * * * *